(12) United States Patent
Ireland

(10) Patent No.: US 10,887,196 B2
(45) Date of Patent: Jan. 5, 2021

(54) EFFICIENT METRIC CALCULATION WITH RECURSIVE DATA PROCESSING

(71) Applicant: Microsoft Technology Licensing, LLC, Redmond, WA (US)

(72) Inventor: Richard Clive Ireland, Oxfordshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 16/202,697

(22) Filed: Nov. 28, 2018

(65) Prior Publication Data

US 2020/0169479 A1 May 28, 2020

(51) Int. Cl.
*H04L 12/24* (2006.01)
*H04L 12/26* (2006.01)

(52) U.S. Cl.
CPC ........ *H04L 41/5009* (2013.01); *H04L 41/142* (2013.01); *H04L 43/04* (2013.01); *H04L 43/0864* (2013.01)

(58) Field of Classification Search
CPC ... H04L 41/5009; H04L 41/142; H04L 43/04; H04L 43/0864
See application file for complete search history.

(56) References Cited

U.S. PATENT DOCUMENTS

| | | | |
|---|---|---|---|
| 8,024,458 B1 | 9/2011 | Buragohain | |
| 8,589,329 B2 | 11/2013 | Bu et al. | |
| 8,949,249 B2 | 2/2015 | Moss | |
| 9,224,163 B2 | 12/2015 | Padmanabhan et al. | |
| 9,697,316 B1* | 7/2017 | Taylor | G06F 11/3006 |
| 9,703,852 B2 | 7/2017 | Blanc et al. | |
| 2003/0225549 A1* | 12/2003 | Shay | H04L 43/12 702/182 |
| 2008/0049629 A1* | 2/2008 | Morrill | H04L 41/00 370/250 |

(Continued)

FOREIGN PATENT DOCUMENTS

EP 3304821 A1 4/2018

OTHER PUBLICATIONS

Brampton, Andrew, "Measuring Percentile Latency", Retrieved from https://blog.bramp.net/post/2018/01/16/measuring-percentile-latency/, Jan. 16, 2018, 6 Pages.

(Continued)

*Primary Examiner* — Jael M Ulysse
(74) *Attorney, Agent, or Firm* — Schwegman Lundberg & Woessner, P.A.

(57) ABSTRACT

Apparatus and a method for controlling a network from a layer 2 node receives multiple latency measurement histograms from the layer 1 nodes and aggregates corresponding bins of the latency measurement histograms to generate an aggregated histogram. Each corresponding bin of the multiple latency measurement histograms and of the aggregated histogram represents a respective range of latency measurement values. The apparatus and method determine from the aggregated histogram, a range of latency measurement values matching a predetermined percentile and transmit control information to at least one network device responsive to the determined range of latency measurement values being greater than a predetermined latency value.

20 Claims, 11 Drawing Sheets

(56) References Cited

U.S. PATENT DOCUMENTS

| | | | |
|---|---|---|---|
| 2010/0292995 A1 | 11/2010 | Bu et al. | |
| 2012/0269089 A1* | 10/2012 | Morrill | H04L 43/065 370/252 |
| 2012/0314599 A1* | 12/2012 | Vilke | H04L 43/04 370/252 |
| 2014/0115207 A1* | 4/2014 | Iyer | G06F 1/3287 710/105 |
| 2015/0117504 A1* | 4/2015 | Harriman | H04L 43/0858 375/224 |
| 2015/0124640 A1* | 5/2015 | Chu | H04L 45/02 370/253 |
| 2016/0182345 A1* | 6/2016 | Herdrich | G06F 12/084 709/224 |
| 2016/0330134 A1* | 11/2016 | Almadi | H04L 45/02 |
| 2016/0337223 A1* | 11/2016 | Mackay | H04L 43/16 |
| 2016/0380892 A1* | 12/2016 | Mahadevan | H04L 45/02 370/389 |
| 2017/0005887 A1* | 1/2017 | Lad | H04L 12/4633 |
| 2017/0026262 A1* | 1/2017 | Lad | H04L 43/045 |
| 2018/0041390 A1* | 2/2018 | Saavedra | H04L 12/2867 |
| 2018/0048549 A1* | 2/2018 | Edwards | H04L 43/0852 |
| 2018/0069783 A1* | 3/2018 | Chu | H04L 12/18 |
| 2018/0212849 A1* | 7/2018 | Hobgood | H04L 43/10 |
| 2019/0228293 A1* | 7/2019 | Imber | G06F 7/5443 |

OTHER PUBLICATIONS

Flom, Peter, "How to Compute Percentiles on a Histogram", Retrieved from https://web.archive.org/web/20170601011147/https/sciencing.com/compute-percentiles-histogram-8507271.html, Jun. 1, 2017, 2 Pages.

Haramati, Nisan, "Latency Histograms and Percentile Distributions in Wallaroo Performance", Retrieved from https://blog.wallaroolabs.com/2018/02/latency-histograms-and-percentile-distributions-in-wallaroo-performance-metrics/, Feb. 20, 2018, 12 Pages.

Hartmann, Heinrich, "Show Me the Data", Retrieved from https://www.circonus.com/2016/01/spike-erosion/, Jan. 14, 2016, 8 Pages.

"International Search Report and Written Opinion Issued in PCT Application No. PCT/US2019/062514", dated Jan. 29, 2020, 13 Pages.

* cited by examiner

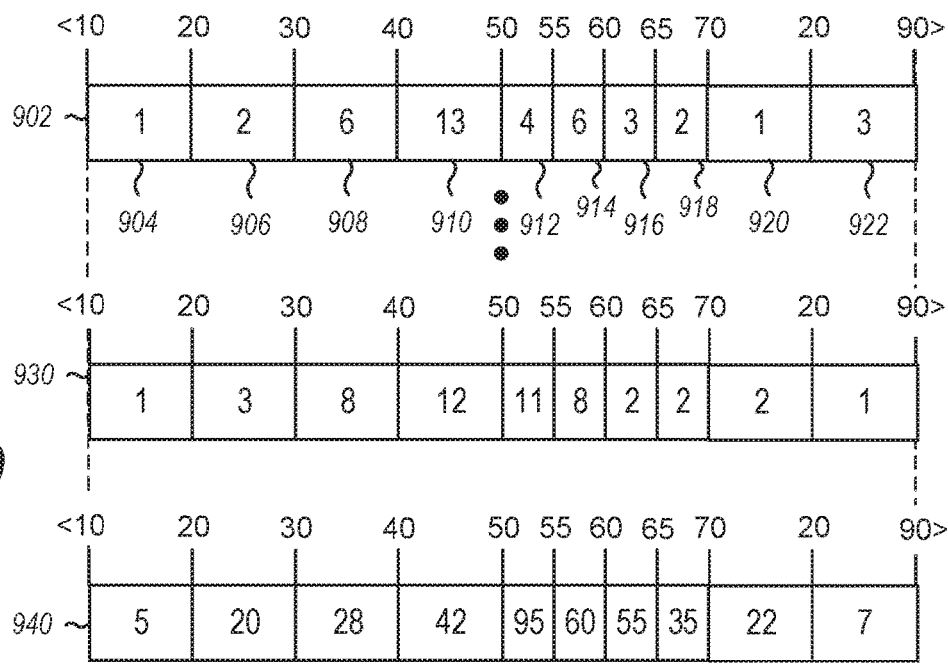
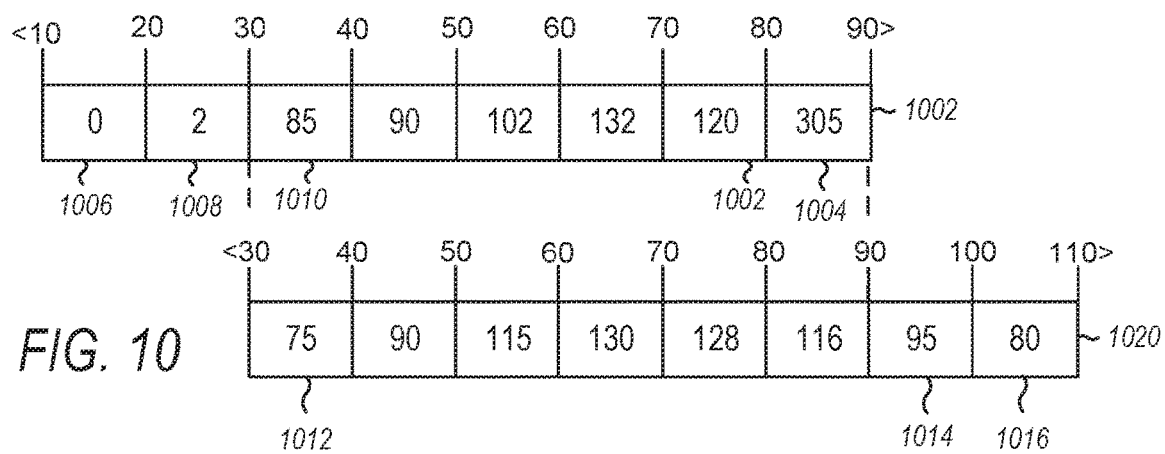
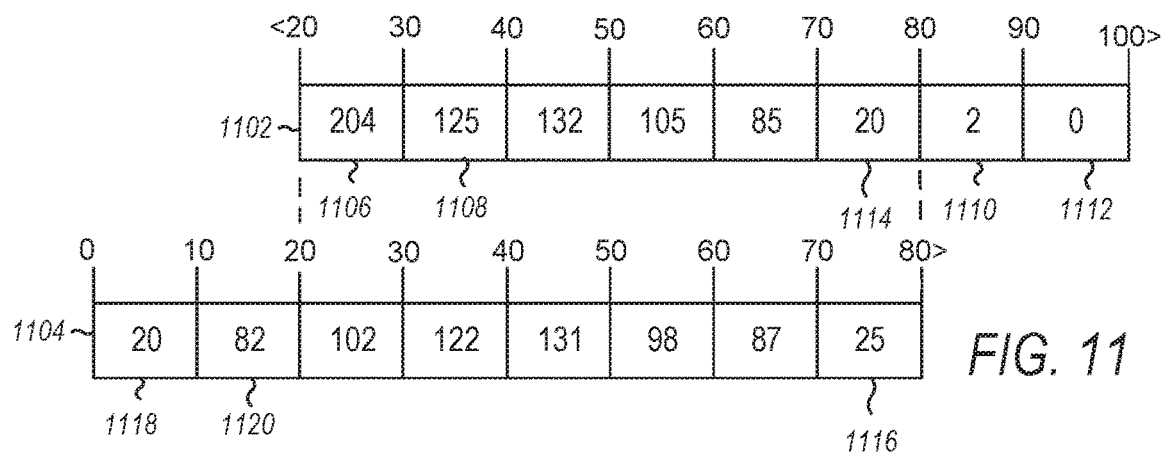
FIG. 9
FIG. 10
FIG. 11

EFFICIENT METRIC CALCULATION WITH RECURSIVE DATA PROCESSING

BACKGROUND

Histograms are useful in many applications. For example, in network management, a histogram of latency measurements may be used to determine whether a contracted quality of service (QOS) is achieved. In image processing, a histogram of pixel values in a region of an image may be used to determine a level of dynamic range compression to apply to the region. In many current systems, histograms are generated at a central location of a network, for example, one or more control nodes, core network servers, and/or monitoring nodes that monitor network performance and/or generate control signals to manage the network. These histograms are generated based on measurements received at the central location from access points, base stations, routers, and/or servers in or coupled to the network and converts the network signals into the histograms. For example, for a network controller concerned with network latency, each node that generates network signals, for example, the recipient of a packet, may measure the latency of the packet by subtracting the time that the packet was sent from the provider (stored in the packet header) from a time that the communication is received at the node. Each node may collect multiple latency values based on different types of traffic, different quality of service (QOS) contracts, different hardware, and different geographical regions. These latency values are then transmitted to a centralized node that generates one or more histograms and analyzes the histogram to monitor network performance and/or generate control signals to manage the network when the generated histogram does not conform to a predetermined level of network performance, for example, when a QOS is not being met.

A histogram, for example, may have multiple bins, each bin corresponding to a range of latency values. The network controller classifies each received latency value into one of these ranges and increments the appropriate bin. These histograms may be used, for example, to determine whether communications for users who have contracted for a particular QOS have a latency that meets the latency required by the QOS contract. In this example, if the actual latency does not conform to the contracted latency, the network controller can adjust the network, for example by shifting lower priority traffic to different paths, or by redistributing the end-user devices among the network nodes in order to reduce the latency for the users having the QOS contracts.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to one aspect, a method for controlling a network from a layer 2 node, which monitors network performance and/or generates control signals to manage the network, includes receiving multiple aggregated data sets from multiple layer 1 nodes and further aggregating the aggregated data sets. The aggregated data sets are histograms or other statistical measures of network performance generated by the layer 1 nodes from network signals generated by one or more nodes in or coupled to the network. The method includes determining network performance from the further aggregated data sets and generating control signals to at least one of change network loading, change routing of data transferred through the network or change priority of at least some of the data transferred through the network.

According to another aspect, an apparatus implemented in a layer 2 node of a network that monitors network performance and/or generates control signals to manage the network. The apparatus includes a network interface that receives multiple aggregated data sets from a plurality of layer 1 nodes. The aggregated data sets are histograms or other statistical measures of network performance generated by the layer 1 nodes from network signals generated by one or more nodes in or coupled to the network. The apparatus further aggregates the multiple layer 1 aggregated data sets. The apparatus determines network performance from the further aggregated data sets and generates control signals to at least one of: change network loading, change routing of data transferred through the network or change priority of at least some of the data transferred through the network.

The following description and the annexed drawings set forth in detail certain illustrative aspects of the claimed subject matter. These aspects are indicative, however, of a few of the various ways in which the principles of the claimed subject matter may be employed and the claimed subject matter is intended to include all such aspects and their equivalents. Other advantages and novel features of the claimed subject matter will become apparent from the following detailed description when considered in conjunction with the drawings.

BRIEF DESCRIPTION OF THE DRAWINGS

FIGS. 7, 8, 9, 10, 11, and 12 are data diagrams illustrating functions performed at the layer 1 and layer 2 nodes according to example embodiments.

DETAILED DESCRIPTION

Figure 1:
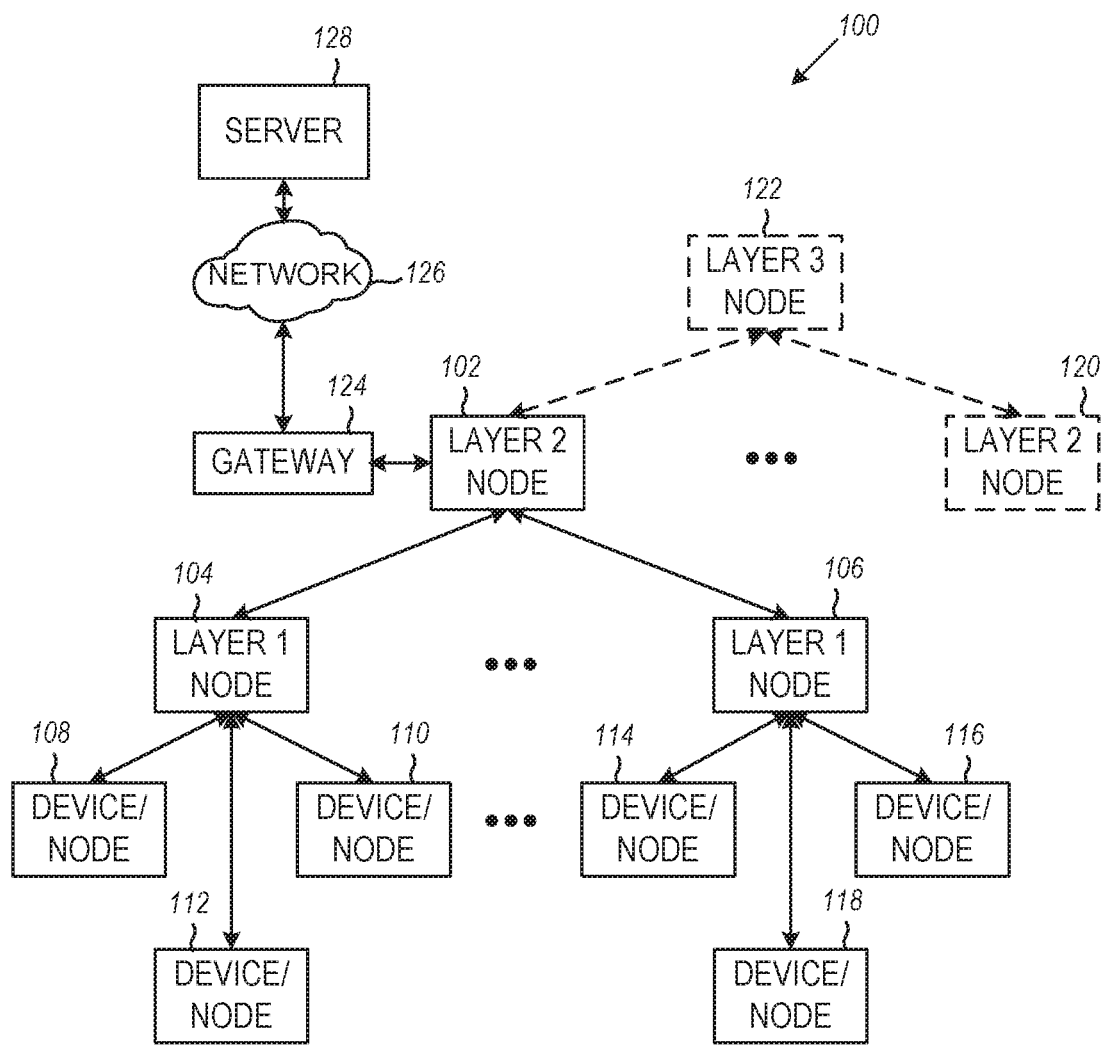
FIG. 1 is a block diagram of a network environment according to an example embodiment.

The disclosed embodiments describe a network that implements a distributed method for generating histograms and calculating percentile values. These embodiments provide a technical advantage in that they reduce the burden on the control node, reduce traffic through the network, and allow for greater aggregation of network statistics at the control node than if the measurement values were sent to the control node.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system which may include a single-core or multi-core microprocessor, a microcontroller and/or a digital signal processor (DSP).

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

As described above, in many current systems, histograms are generated at a central node based on measurements received at the central location from network nodes such as access points, base stations, and routers, and/or from network devices such as servers that are in or coupled to the network. As used herein, the term "node" broadly refers to a network device that exchanges data over with another network device or network node according to a network protocol. A "network device" refers to an endpoint such as a server that receives data from the network. The central node monitors network performance and/or generates controls signals for the network based on the histograms. For example, multiple devices/nodes in a network may process network latency data. Latency data may be generated, for example, by subtracting the time that a packet was sent by the provider (stored in the packet header) from a time that the packet is received at the device/node. Each device/node may collect multiple latency values based on different types of traffic, different quality of service (QOS) contracts, different hardware, and different geographical regions. These latency values are then transmitted to a centralized control node that generates one or more histograms and analyzes the histogram to monitor network performance and/or generate control signals to manage the network. A QOS contract may, for example, require that a certain percentile of packets processed by a network device/node have latencies that are not greater than a predetermined latency value.

The embodiments described below improve on this process by introducing multiple layer 1 nodes that consume network signals from multiple network devices (e.g., access points, base stations, routers, and servers) coupled to the network and convert these signals into aggregated data sets. The layer 1 nodes then send the aggregated data sets to the layer 2 nodes which further aggregate the data sets to generate a network aggregated data set used to determine performance metrics and/or generate control signals for the network. Because each aggregated data set consolidates multiple network signals, the result is much less data being sent through the network and, as described below, the data that is sent may be more easily manipulated by the layer 2 and/or layer 3 or higher nodes to implement the monitoring/control functions.

In the examples described below, the aggregated data sets are histograms. It is contemplated, however, that the layer 1 and layer 2 nodes may process other aggregated data sets including, without limitation, counts of the measurements made by or received at the layer 1 nodes, sums of these measurements, the arithmetic means of the measurements made by or received at the layer 1 nodes as well as the variances and standard deviations, the percentages of the measurements at the layer 1 nodes that are above a predetermined value, the maximum measurement values at the layer 1 node, the minimum measurement values at the layer 1 nodes, the ranges of measurements corresponding to a predetermined percentile at the layer 1 nodes, and the medians of the measurement values at the layer 1 nodes.

An example system may generate hundreds of millions of observations each day. Each observation generated by a network device/node may include a time difference between a current time and a time stamp of a packet received by the network device/node and may be relevant to one or more dimensions. In a conventional system, these observations are passed from the network devices/nodes to the layer 2 node(s) and/or higher layer nodes to determine a percentile of observations that meet a target goal (e.g., a percentile of latency values that are less than a target maximum latency value). The percentile calculation typically sequences all data points to find the target point in the sequence. In a conventional system, each network device/node may send hundreds of observations each minute. The examples described below streamline this operation by performing percentile calculation from histograms rather than from the raw data directly. This enables the network devices nodes to send data to the layer 1 nodes rather than the central (layer 2) node. Each of the layer 1 nodes generates partial histograms which are aggregated in the layer 2 node to monitor and/or control the operation of the network. The examples described below reduce the network traffic by aggregating the observations in the layer 1 node to generate histogram tables and sending the resulting histograms tables to the layer 2 node. Each histogram table may represent hundreds of observations and, because each bin of the histogram aggregates multiple observations over a predetermined interval into a single integer value, transmission of the histogram significantly reduces the data sent through the network. Each layer 2 node aggregates the histogram tables that it receives from the layer 1 nodes to produce the same histogram tables that it would have produced directly from the observations. As described below, the layer 2 nodes may process histogram data over a longer interval than the collection interval of the layer 1 nodes. In this instance, each layer 1 node may aggregate its histogram tables over the longer interval and send only the aggregated histogram to the layer 2 node, further reducing traffic through the network.

In controlling network traffic, both the speed at which control data is processed and the amount of control data passing through the network are desirably kept at low levels to reduce the processing burden on the control node(s) and to reduce the control traffic overhead for the network. In the examples described below, each of the layer 1 nodes of a network locally generates one or more histograms describing the performance of traffic monitored by the layer 1 node during a predetermined interval. The layer 1 nodes may generate respective multi-dimension histograms having a histogram for each dimension. Example dimensions include, without limitation, geographic region, server (e.g., end-user device) identity, and type of communication (e.g., streaming media, voice calls, or search queries). Histograms may also be generated for different latency measurements, for example, for an interval used to traverse the network (e.g., a timestamp for when a packet is received minus a timestamp for when the packet was transmitted) and/or for an interval used to send the observation measurement data from the server to the layer 1 node. The one or more histograms are then transmitted to a layer 2 node (e.g., the control node) which aggregates the histograms received from multiple layer 1 nodes, dimension by dimension and bin by bin. The layer 2 control node generates an aggregated histogram describing the performance of the network at all layer 1 nodes of the portion of the network controlled by the layer 2 node. In the examples below, the layer 2 node provides control signals to at least some of the network devices either directly or through the layer 1 nodes to change the operation of the network. The layer 1 nodes send histograms for multiple intervals which are aggregated by the control node to continually update the combined histogram. Because the layer 1 nodes send histograms to the layer 2 node and the layer 2 node aggregates the histograms based on latest data sets, the examples described below reduce the computational burden on the layer 2 node and reduce control data traffic through the network. The embodiments described below also calculate current percentiles based on a previous percentile calculation plus new data set. They do not reprocess the entire data set to update the percentile calculations.

FIG. 1 is a block diagram of an example network environment 100. This network is simplified to aid in describing the example embodiments. It is contemplated that an actual network may have many more de vices and/or nodes. The network environment 100 includes a number of network nodes or devices, 108, 110, 112, 114, 116, and 118. Each of the network devices/nodes communicates with a respective layer 1 node. In the example shown in FIG. 1, network devices/nodes 108, 110, and 112 communicate with layer 1 node 104 while devices/nodes 114, 116 and 118 communicate with layer 1 node 106. Each layer 1 node in turn communicates with a layer 2 node. Thus, layer 1 nodes 104 and 106 communicate with layer 2 node 102. An example network may include higher layer monitoring/control nodes such as the layer 3 node 122, shown in dashed lines in FIG. 1. The layer 3 node may also connect with other layer 2 nodes as shown by the connection between the layer 3 node 122 and the layer 2 node 120, also shown in dashed lines. The embodiments described desirably synchronize the layer 1 nodes to each other and to the layer 2 nodes, and optionally to the layer 3 nodes or higher-level nodes. This synchronization may be achieved using a time synchronization protocol such as the network time protocol (NTP) or the precision time protocol (PTP).

The example network also includes a gateway 124 that couples layer 2 node 102 to a server 128 via a network 126 (e.g., the Internet). Although not shown, there may be a gateway between the layer 3 node 122 and the network 126 in place of or in addition to the gateway 124 between the layer 2 node 102 and the network 126. Although not shown in FIG. 1, it is contemplated that the network environment may include higher layers than layer 3. The histograms generated at each level may be aggregated at the higher levels according to the example embodiments described below. The generation of the aggregated histograms at each higher layer may be performed recursively from the highest level to the lowest level.

In addition to aggregating the histograms, other statistics of the layer 1 nodes may be aggregated at higher layers based on the histograms received from the layer 1 nodes. These include counts of the measurements made by or received at the layer 1 nodes, sums of these measurements, the arithmetic means of the measurements made by or received at the layer 1 nodes as well as the variances and standard deviations, the percentages of the measurements at the layer 1 nodes that are above a predetermined value, the maximum measurement values at the layer 1 node, the minimum measurement values at the layer 1 nodes, the ranges of measurements corresponding to a predetermined percentile at the layer 1 nodes, and the medians of the measurement values at the layer 1 nodes. This data may be generated from the histograms and aggregated even though the actual measurement values are not transmitted to the higher layers. As with the histogram aggregation, these statistics may be determined recursively with each layer providing input data to the next higher layer. Aggregation of the separate percentile values, the separate median, variance and standard deviation values for the layer 1 nodes would be difficult in a conventional system in which the layer 2 node receives the measurements rather than receiving the layer-1 histograms.

The layer 1 nodes may also modify their histograms based on the collected statistics. For example, as described below with reference to FIGS. 10 and 11, the range of the histogram may not be compatible with the range of measurement values. This may be detected by comparing the mean of the measured values to the middle value of the histogram. When these values differ by more than a threshold, the example layer 1 node modifies the histogram so that the range of the histogram is consistent with the range of values being measured. Any such modification, however, may need to be coordinated with the other layer 1 nodes to ensure that the histograms received at the layer 2 node(s) are compatible and can be aggregated.

In the network shown in FIG. 1, each of the network devices/nodes 108, 110, 112, 114, 116, and 118 may receive data from different types of end user devices, for example smart phones, tablet computers, laptop computers, server computers, or other type of computing device. These nodes may communicate with each other, for example an end-user device coupled to device/node 108 may initiate a call to an end-user device coupled device/node 114. Alternatively, or in addition, an end-user device coupled to device/node 112 may receive a data stream from the server coupled to end-user device 128 via the network 126 and the gateway 124. Each of the end-user devices coupled to the network devices/nodes 108, 110, 112, 114, 116 and 118, may have a service agreement with a network provider that includes a contract for a particular QOS. As used herein, a data stream may be one or more streams of over the top (OTT) streaming data and/or one or more in-band streams of data packets. Each layer 1 nodes 104 and 106 collects statistics on the data received by the devices coupled to the network device nodes that it serves and provides these statistics to the layer 2 node that serves the layer 1. For example, the layer 1 104 may collect data regarding the call between end-user devices coupled to devices/nodes 108 and 114 and on the data stream provided to the end-user device coupled to device/node 112.

These statistics may be divided into dimensions such as, without limitation, different types of QOS contract, different communication types (e.g., calls and streaming media), different geographic regions, different server identities. These statistics may be used to monitor the performance of the network and/or control network connectivity and priorities, for example, to ensure that the QOS contracts are being met. The statistics collected by the layer 1 nodes may be sent to the layer 2 nodes, which may aggregate the statistics to monitor and/or control the network devices to which they are connected. As described above, the layer 1 nodes may generate other statistics, such as counts of the measurements made by or received at the layer 1 nodes, sums of these measurements, the arithmetic means of the measurements made by or received at the layer 1 nodes as well as the variances and standard deviations, the percentages of the measurements at the layer 1 nodes that are above a predetermined value, the maximum measurement values at the layer 1 node, the minimum measurement values at the layer 1 nodes, the ranges of measurements corresponding to a predetermined percentile at the layer 1 nodes, and the medians of the measurement values at the layer 1 nodes, which may be aggregated at the layer 2 nodes. Alternatively, or in addition, the layer 2 nodes may send the aggregated statistics to the layer 3 nodes, if they exist, which may further aggregate the statistics to monitor and/or control a larger portion of the network environment 100.

Figure 2A:
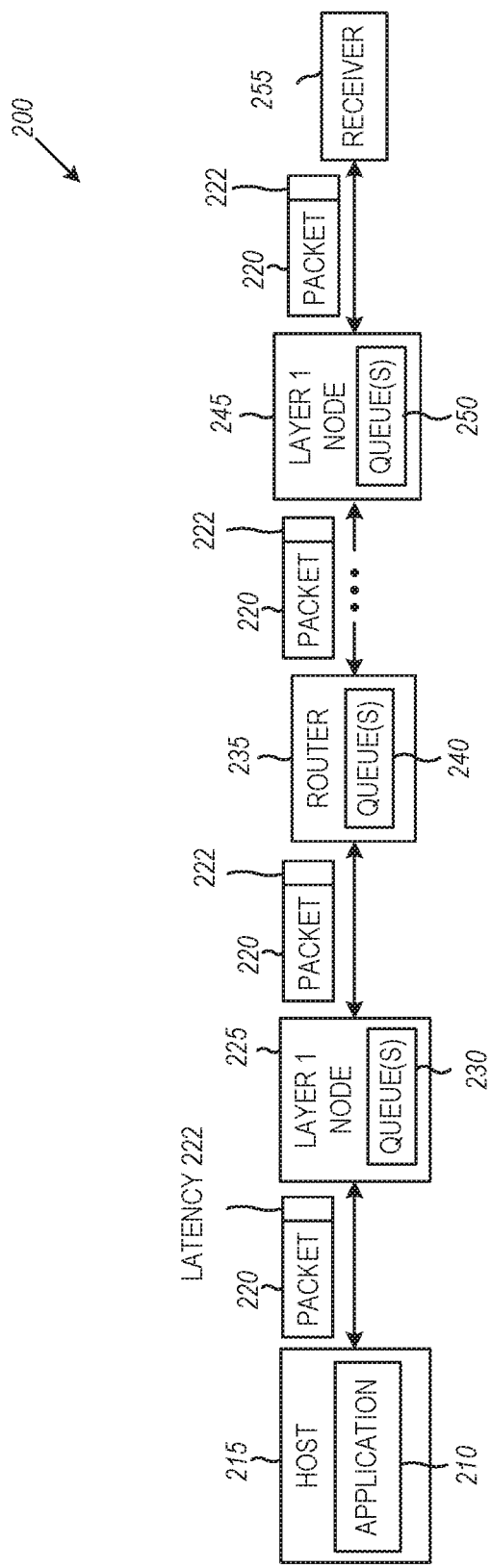
FIG. 2A is a block diagram illustrating a path through a network according to an example embodiment.

One useful statistic that may be used to monitor and/or control a network environment is packet latency. FIG. 2A is a block diagram illustrating an example path through a network environment such as the environment 100 shown in FIG. 1. As may be seen, a host 215 (end user device or server) produces packets 220 that are routed through and one or more access points and/or routers to arrive at a receiver 255. In the embodiment of FIG. 2A, packet 220 is routed through an access point 225, one or more routers 235 until it reaches an access point 245 that serves the receiver 255. In FIG. 2A, each of the routers 225, 235, and 245 includes one or more queues 230, 240, and 250, respectively.

In one embodiment, an application 210 executes on a host 215. The application 210 may be any type of application, such as a communication application, an email application, process control application, video server, or other type of application that generates packets 220 and/or data streams to be sent to one or more destination devices, such as the receiver 255.

The destination devices may be, without limitation, one or more consumers of over the top (OTT) video streaming services, email clients, and/or web browsers. The packets 220 may be labeled with latency information 222, such as a time stamp. It is contemplated that other latency information may be used in addition to or in place of the time stamp. The latency measurement may be, for example, a latency budget for the packet that is decremented by each access point/router that processes the packet. In some embodiments, the latency information 222 may be included as a field in the packet 220 header.

Some packets 220 may be subject to a contract having a higher QOS than other packets. The higher QOS may cause the access points 225 and 245 and the intermediate routers 235 to process the packet more quickly as described below with reference to FIG. 2B.

In the example system shown in FIG. 2A, the packets 220 are provided to a layer 1 node that may be coupled to an access router 225. In the example embodiment, the access point includes one or more queues 230. In some embodiments, the access router 225 may receive the latency information 222 (e.g. a time stamp) to be applied to the packets 220 from the application 210 via the host 215. In one embodiment, the host 215 may provide default latency information 222 for selected streams of related packets 220 or packets 220 of a certain type. The access router node 225 may also determine latency information 222 based on network condition information provided from other nodes in the network 200 and label the packets 220 with this determined latency information 222. The packets 220 may then be placed into one or more of the queues 230 based on the latency information 222. In effect, the packet 220 is placed into the queue 230 based on a temporal priority such that it may hop through the network 200 through multiple routers, each having queues, and each of which inserts the packet 220 into one or more respective queues based on the latency information 222 such that high-priority packets 220 traverse the network 200 from the host 215 to the receiver 255 in less time than packets lower priority packets.

In the embodiment shown, an intermediate router 235, coupled to receive the packets 220 from the access router 225, has queue(s) 240, and may be coupled directly or via multiple other intermediate routers to a layer 1 node 245, which also has queue(s) 250. Packets 220 received by the layer 1 node 245 are delivered to the receiver 255. A layer 1 node may be configured to receive latency information from each of the access router 225, intermediate routers 235 and 245 and/or the receiver 255.

Although the network 200 is shown as including one host 215, one receiver 255, and a single path, including the routers 225, 235, and 245, between the host 215 and the receiver 255, it is contemplated that the network 200 may include multiple hosts and multiple access routers that connect to each other and to multiple receivers along multiple paths. Each of the multiple routers may be used in more than one path.

Figure 2B:
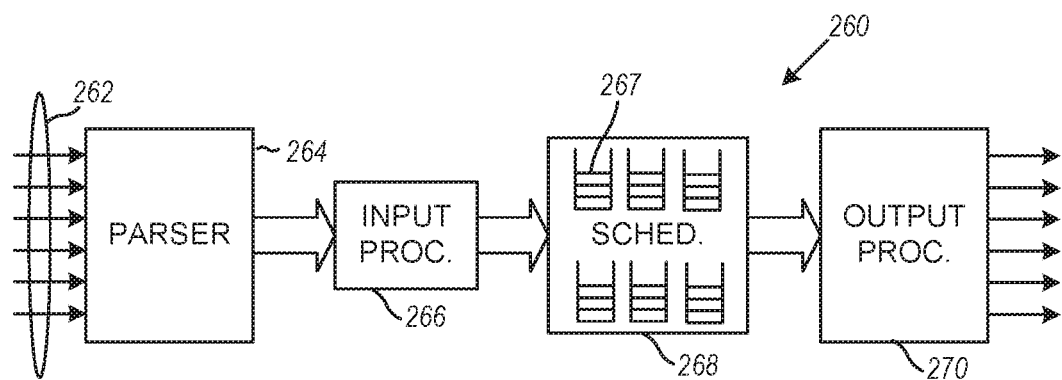
FIG. 2B is a block diagram of a network node and/or router according to an example embodiment.

FIG. 2B is a block diagram of an example router 260 suitable for use as the router 225, 235, or 245 shown in FIG. 2A. The router 260 may be implemented using Open Systems Interconnection (OSI) level 3 hardware such as the Tofino switch available from Barefoot Networks or the Trident II+ switch available from Broadcom. The example router 260 includes a parser 264, an input processor 266, a scheduler 268 including multiple queues 267, and an output processor 270. The parser 264 may, for example, extract the destination IP addresses from packets 262 received by the router 260. These IP addresses may be translated to data link addresses by the input processor 266 using a routing table (not shown). The scheduler 268 routes the received packets to appropriate queues 267 based on the data link addresses and the QOS of the packets. The output processor 270 may adjust the data rate of the packets based on the physical links between the router 260 and the destination address identified for each packet. For example, queues for high QOS packets may be shorter and/or have a higher priority than queues for lower QOS packets. If a segment of the network is not meeting a particular QOS contract, for example, the priorities can be adjusted so more of the higher QOS packets are processed than the lower QOS packets. The scheduler may also change packet routing to reroute the packets to a path having a lower latency. One way to accomplish this may be to hand off an end user device to an access point having greater available bandwidth. Another way to reroute the packets may be to change the routing table used by the input processor.

In example embodiments, each router 225 and 245 node may generate latency data on the packets it receives. In addition, each router 235 may generate latency data on the packets it processes. When a node or router accumulates a predetermined amount of latency data it sends the data to the layer 1 which generates histograms and passes the histograms to the layer 2 node that aggregates the histograms with other histograms from other network nodes to monitor and/or control the various nodes in the network or a subset of the network.

Figure 3:
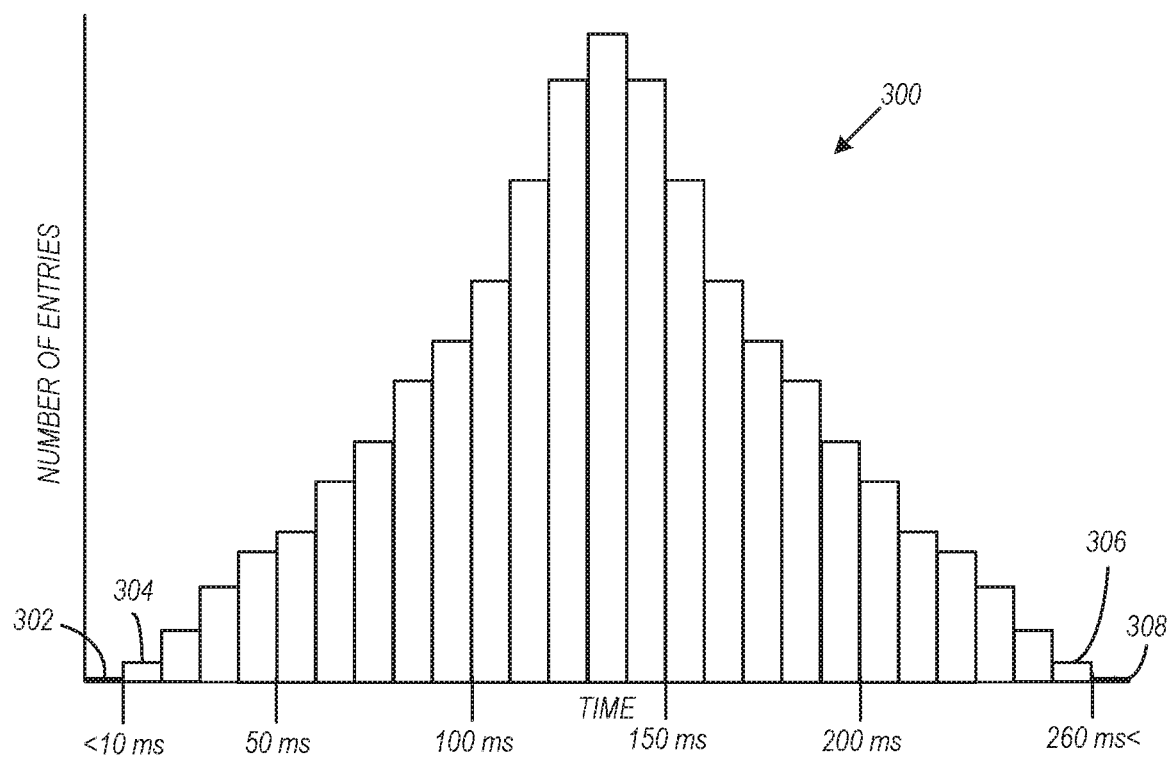
FIG. 3 is a graph of number of entries versus time that is useful for illustrating the properties of a histogram according to an example embodiment.

One type of data used in network monitoring/management is a latency histogram such as the histogram shown in FIG. 3. The histogram includes a number of bins of which only bins 302, 304, 306 and 308 are labeled in FIG. 3. The example bins represent successive 10 millisecond (ms) ranges. Each bin represents a count of packets that fall within a range of latency values. For example, bin 302 holds a number of packets that had latencies of less than 10 ms. Bin 304 holds a number of packets that had latencies between 10 ms and 20 ms and so on until bin 306 holds the number of packets that had latencies between 250 and 260 ms and bin 308 holds the number of packets that had latencies greater than 260 ms.

Figure 4:
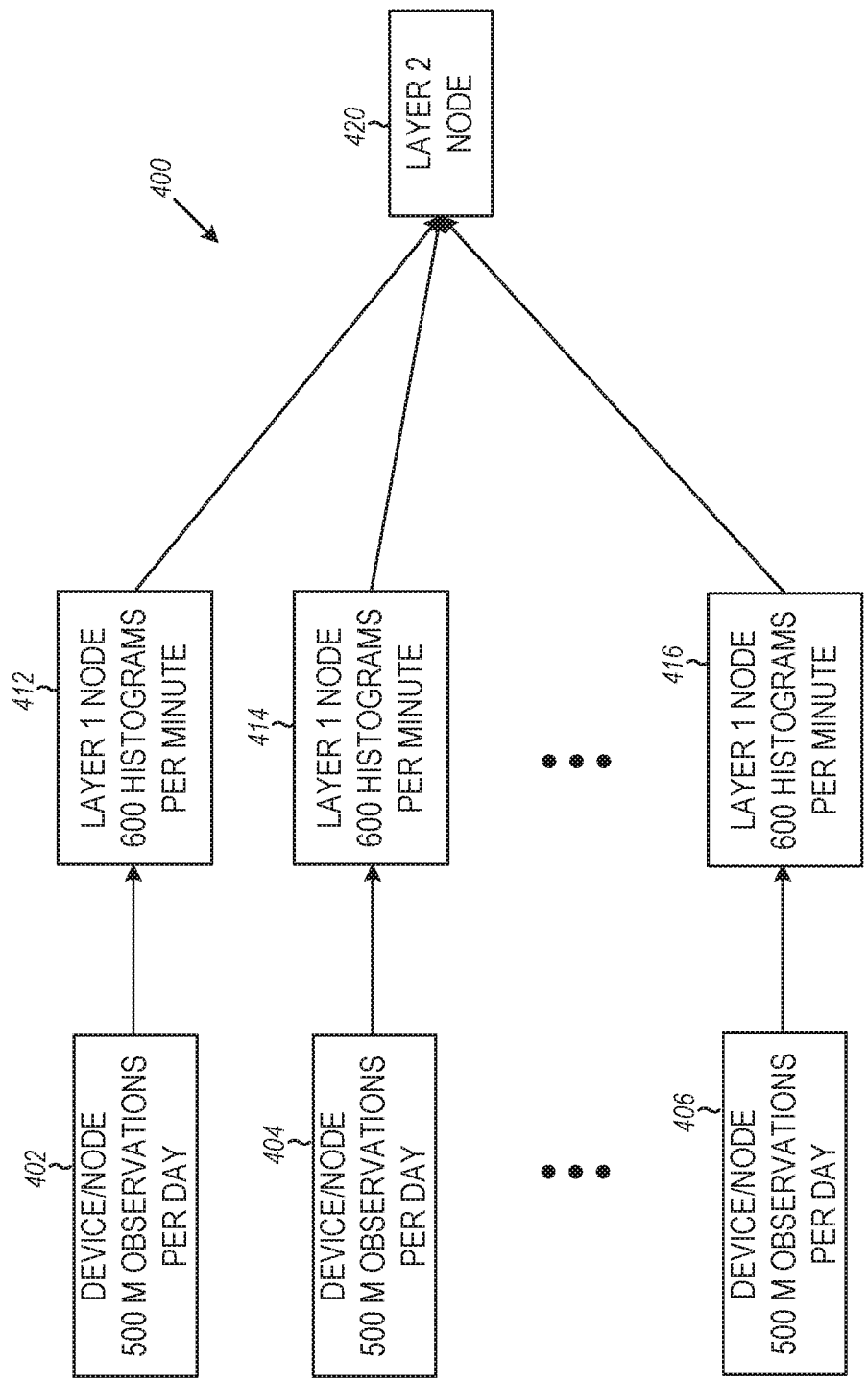
FIG. 4 is a block diagram of a network showing control flows between layer 1 and layer 2 nodes according to an example embodiment.

FIG. 4 shows an example network 400 to illustrate data savings achieved using the embodiments described below. The network 400 includes three layer 1 nodes, 412, 414, and 416 that receive observations related to respective data streams from network devices/nodes 402, 404 and 406. As shown, in FIG. 4, the network 400 may include more layer 1 nodes receiving more data streams. Each data stream may be a single stream or an aggregate of multiple packet streams received by the layer 1 node. In the example, each stream from network devices/nodes 402, 404, and 406 generates/processes approximately 500 million observations per day. Each observation may include a time stamp on a packet received by the layer 1 node. As described above, in a conventional system, these observations would be passed through the layer 1 nodes 412, 414, and 416 to the layer 2 node 420.

In a network according to the example embodiments, however, each layer 1 node 214, 216 and 218 generates histograms from the observations for multiple dimensions in a histogram table and passes the histogram table to the layer 2 nodes. Each layer 1 node 412, 414, and 416 in the example network 400 is configured collect statistics for the following dimensions: three region dimensions, 10 server node dimensions, and 10 communication type dimensions. In addition, each layer 1 node 412, 414, and 416 processes two metrics in each dimension: 1) the latency measurement generated by the servers (e.g., the times tamp for when the packet was sent subtracted from the timestamp for when the packet was received) and 2) a latency from the server to the layer 1 node (e.g., a timestamp at which the observation was received by the layer 1 node minus a timestamp at which the observation was sent by the server). Thus, each layer 1 node in this example generates 600 histograms for 600 dimensions, respectively, for each observation stream during each interval (three regions×10 server nodes×10 communication types×two latency metrics). In the example network 400, each of the layer 1 nodes generates a histogram table each interval (e.g., 1 minute) based on observations received during that interval and sends the histogram table to the layer 2 node 420.

Each layer 1 node 412, 414, and 416 generates 600 histograms per minute and passes these histograms to the layer 2 node 420, resulting in a data volume reduction from 347,000 observations per data stream per minute to 600 histograms per layer 1 node per minute. This represents a significant reduction in data volume flowing from the layer 1 nodes 412, 414, and 416 to the layer 2 node 420 relative to a system in which only the layer 2 node 420 generates the histograms. In examples described below, the layer 2 node 420 aggregates the histograms from all of the layer 1 nodes 412, 414, and 416 and extracts percentile measurements from the aggregated histogram. Thus, if the layer 2 node 420 is configured to extract only the 99th percentile from each histogram of each aggregated histogram the layer 2 node calculates 2,880 percentile values per day regardless of the number of layer 1 nodes 412, 414, and 416 contributing to the aggregated histogram generated by the layer 2 node 420.

Figure 5A:
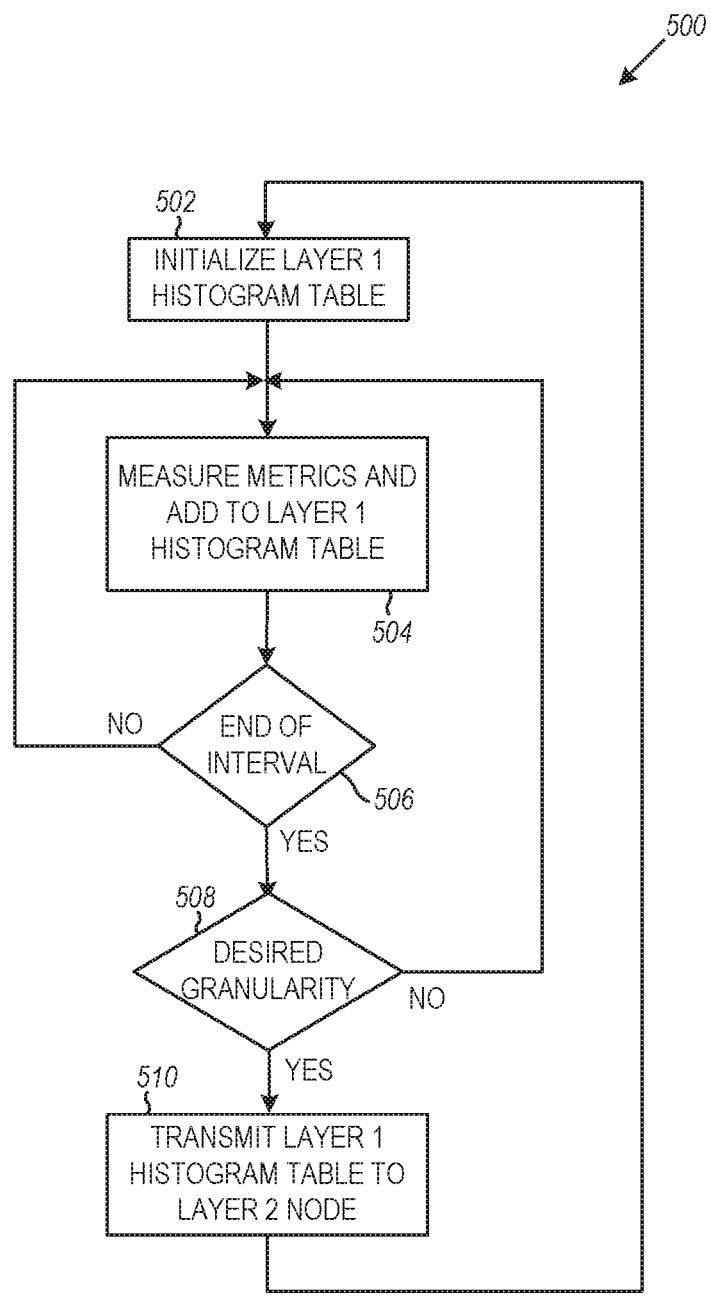
FIG. 5A is a flow-chart diagram showing operations performed in a layer 1 node handling switched packet data according to an example embodiment.
Figure 5B:
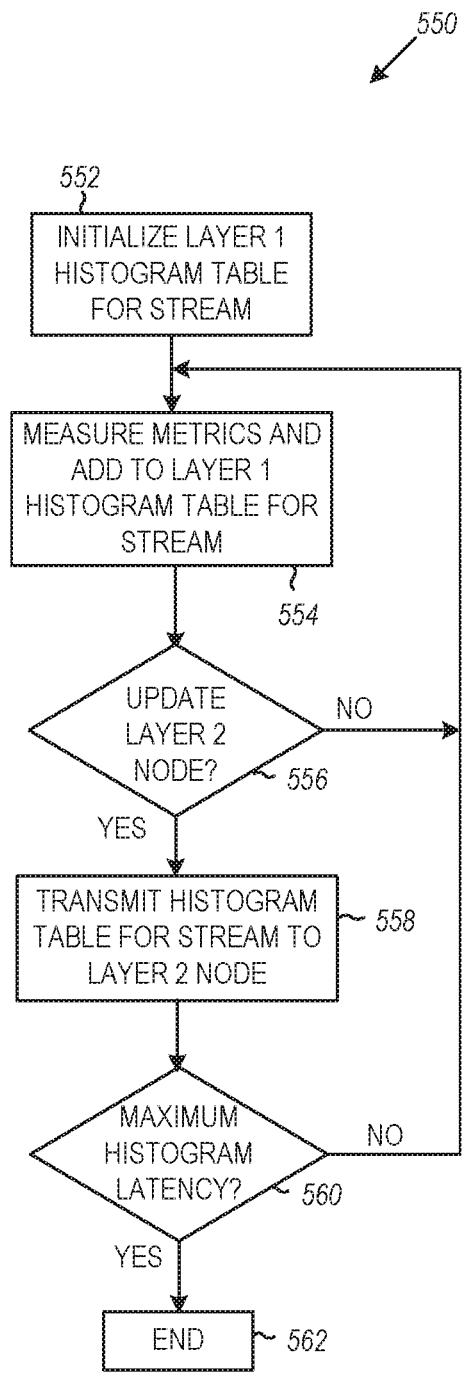
FIG. 5B is a flow-chart diagram showing operations performed in a layer 1 node handling a data stream according to an example embodiment.

FIGS. 5A and 5B show example processes 500 and 550 that may be implemented in the layer 1 nodes 412, 414, and/or 416. The process 500 is used in layer 1 nodes handling data transferred through a local network while the process 550 is used in layer 1 nodes handling data streams that may have more remote sources. An example layer 1 node can handle both network data and data streams and can implement both processes. In addition, an example layer 1 node that handles multiple data streams implements a separate process 550 for each data stream. The process 500 is used to determine latencies of packets in a network switch. These packets are generated locally and are typically received in order. The process 500 aggregates data in the histogram tables over a predetermined interval and/or to achieve a granularity requested by the layer 2 node and transmits the aggregated histograms to the layer 2 node. The process 550 determines latencies of data stream packets which may not be generated locally and may not arrive at the layer 1 node in order. In this instance, a layer 1 node may maintain multiple histogram tables, one for each stream, as the layer 1 node receives new observations for a stream, it aggregates the new observations into the histograms of the histogram table for the stream or in a histogram dimension for the stream in a histogram table. The layer 1 node may forward the aggregated histogram table to the layer 2 node at regular intervals or at intervals that increase in duration with an increase in time since the start of the stream.

For the process 500, at operation 502, the layer 1 node initializes each histogram in its histogram table (e.g., 600 histograms in the above example), each initialized histogram has, for example, 300 empty bins. As described above, each bin represents a range of measured latency values. At operation 504, as each observation is received, the layer 1 node determines the corresponding metric (e.g., latency value), maps the metric into a corresponding bin of one or more of the 600 histograms, and increments the value of the corresponding bin in the one or more of the histograms. At operation 506, the process 500 branches back to operation 504 to continue to add metrics to the histograms in the histogram table until the end of the interval, which in an example embodiment, is 1 minute. Operation 508 determines whether the histogram table covers the desired granularity. While the layer 1 node generates histogram tables over an interval of 1 minute, this interval may be smaller than the interval of data processed by the layer 2 node. A layer 2 node, for example, may operate on data accumulated over a longer interval, for example, 1 hour or more. In operation 508, the process 500 determines whether the layer 1 node has accumulated the data over the interval used by the layer 2 node. If it has not, the process branches back to operation 504 to accumulate additional data into the histogram table. If, at operation 508, the histogram table has the desired granularity, at operation 510, the layer 1 node transmits the histogram table to the layer 2 node 420.

Operation 552 of process 550, shown in FIG. 5B, initializes a layer 1 histogram table for a data stream or initialized a histogram dimension for a data stream in a histogram table. This example operation 552 generates a set of histograms, one for each stream dimension, each histogram having a number of empty bins corresponding to the range of measurements to be monitored and the desired granularity of the measurements within the range. At operation 554, the process 500 converts the received observations into measured metrics (e.g., latency values) and aggregates the measured metrics into the histogram table for the stream. The aggregation is the same as described above with reference to FIG. 5A. Operation 556 determines whether the aggregated histogram should be sent to the layer 2 node.

Aggregated histograms for data stream desirably include data for an entire stream. As described above, this data may arrive out of order. Consequently, operation 556 may determine to update the aggregated histogram or histogram table for the stream in the layer 1 node multiple times. For example, operation 558 may send the aggregated histogram table to the layer 2 node a predetermined interval after the start of the stream and/or after a predetermined number of observations for the stream have been received. Operation 558 may determine to update the aggregated histogram for the stream in the layer 2 node at fixed intervals, at intervals that increase with increasing age of the data stream, and/or when a predetermined number of new observations have been processed.

After sending the aggregated histogram table including the updated histogram for the stream, operation 560 monitors the data to determine whether the stream has ended. This may be detected when no observations have been received over a predetermined interval, for example, 1 day. When operation 560 has not detected the end of the stream, process 550 branches back to operation 554 to aggregate additional observations into the histogram table for the stream. When operation 560 detects the end of the stream, process 550 ends at operation 562.

The process 550 in FIG. 5B shows operations performed by a layer 1 node for one data stream. It is contemplated that a layer 1 node may handle multiple streams and implement multiple instances of the process 550, one for each stream. While the process describes separate histogram tables for each stream, it is contemplated that data for each stream may be assigned to one or more dimensions in a single histogram table. Also, a layer 1 node may handle both network switched packets and streaming data packets and, thus, may implement an instance of the process 500 in addition to one or more instances of the process 550.

Figure 6:
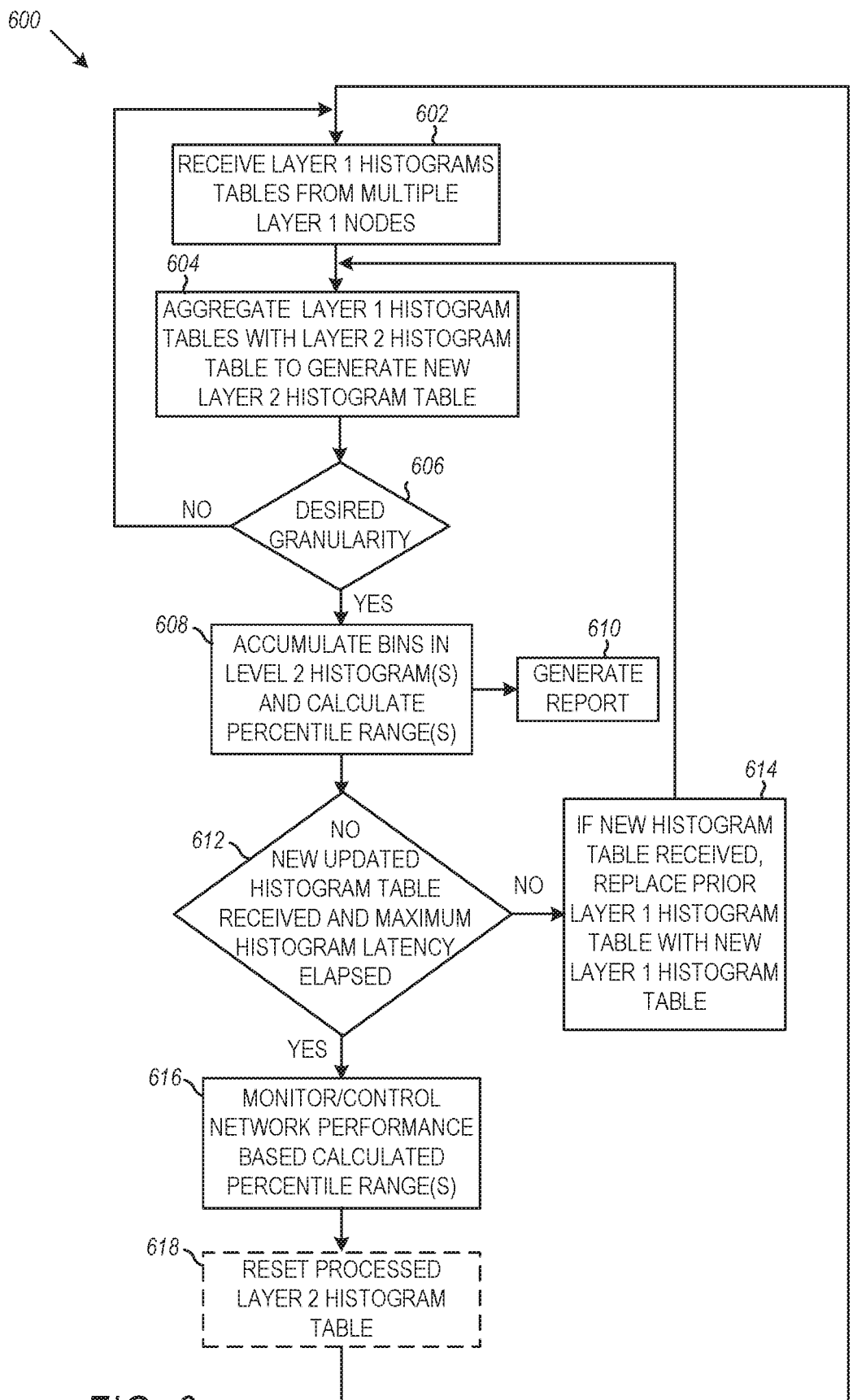
FIG. 6 is a flow-chart diagram showing operations performed in a layer 2 node according to an example embodiment.
Figure 7:
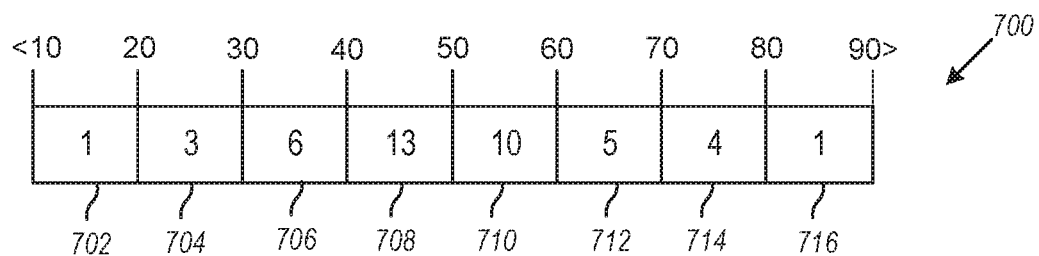

FIG. 6 is a flow-chart diagram showing an example process 600 performed by a layer 2 node 420. The process is described with reference to the data diagrams of FIGS. 7 and 8. At operation 602, the layer 2 node 420 receives histogram tables from multiple layer 1 nodes (e.g., layer 1 nodes 412, 414, and 416). As described above, each histogram table includes a set of histograms, one for each of multiple dimensions covered by the table. FIG. 7 shows an example histogram for a single dimension and having eight bins. The first bin, 702, includes a count of measured latencies less than 20 ms. The remaining bins hold counts of the measured latencies between 20 ms and 30 ms (bin 704), 30 ms and 40 ms (bin 706), 40 ms and 50 ms (bin 708), 50 ms and 60 ms (bin 710), 60 ms and 70 ms (bin 712), 70 ms and 80 ms (bin 714) and greater than 80 ms (bin 716).

Figure 8:
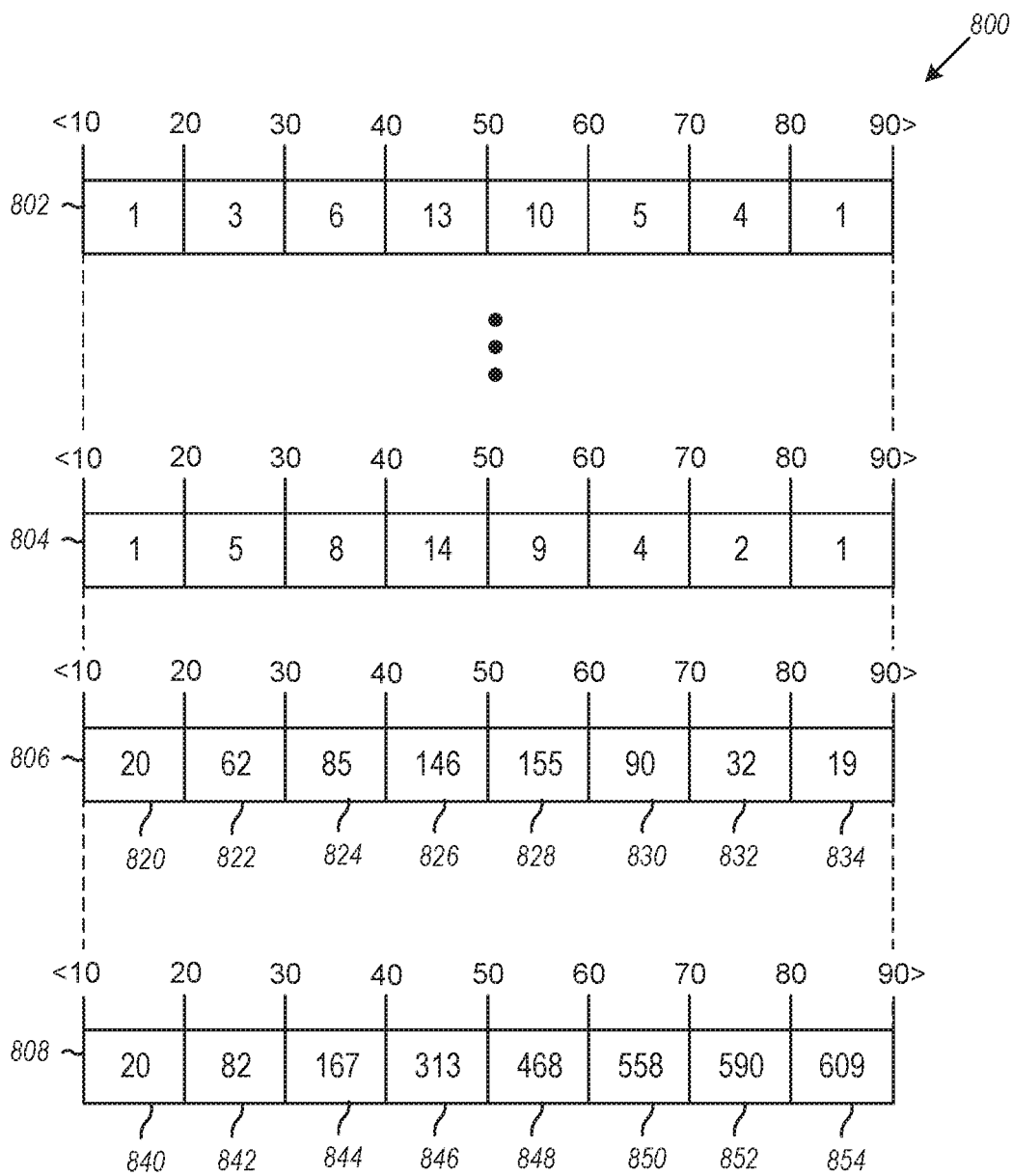

The layer 2 node 420 has a histogram table corresponding to the histogram table generated by each of the layer 1 nodes. Depending on the statistics being monitored, the histogram table maintained by the layer 2 node 420 may have fewer dimensions than the histogram tables provided by one or more of the layer 1 nodes. At operation 604, the layer 2 node 420 aggregates the multiple layer 1 histogram tables into the layer 2 histogram table by aggregating the bins of each of the layer 1 histogram tables to the corresponding bins of the layer 2 histogram table. This is illustrated in FIG. 8 for the single dimension. As shown in FIG. 8, histograms 802 through 804 are summed bin by bin to produce the aggregated histogram 806.

The histogram table generated by the layer 2 node may have a coarser granularity than the histogram tables generated by the layer 1 nodes. For example, operation 606 determines whether a number of histogram tables from each of the layer 1 nodes have been processed to achieve the granularity used by the layer 2 node. If the number of histogram tables is less than this granularity, operation 606 returns control to operation 602 to continue to accumulate histogram tables. For example, the layer 1 nodes may generate a new histogram table each minute while the layer 2 node may use a histogram table having histograms with a granularity of 15 minutes. In this example the process 600 aggregates 15 histograms tables received from each of the layer 1 nodes 412, 414, and 416 at 1-minute intervals to achieve the desired granularity. As described above, the layer 1 nodes may aggregate the histogram tables to achieve the granularity used by the layer 2 nodes. This may be advantageous as it further reduces the data traffic through the network.

A layer 2 node may control the histogram generation by the layer 1 nodes by specifying parameters of the histogram tables. These parameters may include the number of bins in the histogram, the measurement interval represented by each bin, the maximum and minimum measurement values monitored by the layer 1 nodes, the number of dimensions in the histograms, the granularity of intervals that the layer 1 nodes aggregate the histograms, and/or an amount of time between receiving an observation from a data stream and the end of the data stream.

When, at operation 606, the layer 2 histogram table is at the desired granularity, the layer 2 node, at operation 608 accumulates the bins one or more of the histograms in the layer 2 histogram table to determine desired percentile ranges. This operation is illustrated with respect to the aggregated histogram 806 and totaled histogram 808 of FIG. 8. The summing of the bins of the aggregated histogram 806 to generate the totaled histogram 808 may be performed recursively. The totaled value for bin 840 is the same as the value of first bin, 820, of the aggregated histogram 806. The second bin 842 of the totaled histogram 808 is the sum of bins 820 and 822 of the aggregated histogram 806. Similarly, the process generates each of the other bins of the totaled histogram by summing the corresponding bin of the aggregated histogram 806 with all previous bins of the aggregated histogram. This is the same as adding the corresponding bin of the aggregated histogram to the immediately previous bin of the totaled histogram. Thus, the process adds totaled bin 842 to aggregated bin 824 to generate totaled bin 844; adds totaled bin 844 to aggregated bin 826 to generate totaled bin 846; adds totaled bin 846 to aggregated bin 828 to generate totaled bin 846; adds totaled bin 848 to aggregated bin 830 to generate totaled bin 850; adds totaled bin 850 to aggregated bin 832 to generate totaled bin 852; and adds totaled bin 852 to aggregated bin 834 to generate totaled bin 854. As shown in FIG. 6, operation 610 may generate a report including the aggregated histogram 806 and/or the totaled histogram 808 which may be used to control the network as described below with reference to operation 616.

Operation 612 determines whether the layer 2 node has received an updated histogram from any of the layer 1 nodes or whether the maximum histogram latency has elapsed. As described above, a new layer 1 histogram may be generated when a layer 1 node handling one or more data streams receives latency data for a packet that is out of order in the packet stream. When operation 612 determines that an updated histogram table has been received, operation 614 replaces the previous histogram table received from the layer 1 node with the updated table and reaggregates the layer 2 histogram table. To ensure that late data is processed properly, the layer 2 node may maintain the histogram tables from the layer 1 nodes for an interval, for example, the desired granularity of the layer 2 node. The layer 2 node may reaggregate the histogram table, for example, either by reaggregating all of the layer 1 histogram tables after the updated histogram table has been substituted for the previous table or by subtracting the previous histogram table for the layer 1 node that sent the new data, bin-by-bin from the current aggregated histogram and then adding the updated histogram table. As an alternative to storing the histogram tables from all of the layer 1 nodes, a layer 1 node providing an updated aggregated histogram table for a stream may transmit both the previous histogram table and the updated histogram table to the layer 2 node so that the layer 2 node can reaggregate by subtracting the previous histogram table and adding the new histogram table.

Operation 612 also determines whether the maximum histogram latency has elapsed. If it has not, control is returned to operation 602 to receive additional layer 1 histogram data. When operation 612 determines that no new updated histogram table has been received and that the maximum histogram latency has elapsed, operation 616 monitors and/or controls network performance based on the calculated percentile ranges.

The range of latencies corresponding to a desired percentile may be determined from the totaled histogram by multiplying the number in the last bin of the totaled histogram (the total of all bins in the aggregated histogram) by a fraction corresponding to the desired percentile (e.g. 0.97 corresponds to the $97^{th}$ percentile) and finding the lowest bin of the totaled histogram having a value that is greater than the resultant value. The boundaries of the corresponding totaled bin correspond to the boundaries of the $97^{th}$ percentile of the aggregated histogram. For example, using the aggregated histogram 806 and the totaled histogram 808, to find the $90^{th}$ percentile of the histogram 806, the operation 612 of process 600 multiplies 609 by 0.9 to produce a value 548.1. This value is in bin 850 of the totaled histogram. Consequently, the range of the aggregated histogram corresponding to the $90^{th}$ is 60 ms to 70 ms, the range spanned by bin 850.

QOS contracts of a network provider may specify latency requirements based on a percentile. For example, a QOS contract may specify that communications will be handled with a latency of 80 ms or less in the $98^{th}$ percentile. When the determined latency range for the $98^{th}$ percentile is greater than 80 ms, the layer 2 node controls the network devices coupled to the layer 1 nodes to decrease latencies. The control exerted by the layer 2 node depends on the histogram dimension that is not meeting the QOS contract. When, for example, the histogram for a particular server is not meeting the contract, the layer 2 node may allocate additional network bandwidth to packets originating at the server or may reduce the priority of packets originating from competing servers. When a histogram for a particular region is not meeting the contract, the layer 2 node may cause the access points/base stations serving the region to hand off end-user devices to access points/base stations serving other regions. When a histogram for a first communication type is not meeting the QOS contract but histograms for other call types are meeting their QOS contracts, the layer 2 node may instruct the network device(s) handling the first communication type to increase the priority of the first communication type.

Returning to FIG. 6, after operation 608 calculates the desired percentile range and operation 612 determines that the maximum histogram latency has elapsed and no new updated histogram table has been received, operation 616 reports the percentile range to a control node and/or sends control packets to the network devices receiving the streams from the network devices/nodes 402, 404, and 406 and/or to any intermediate routers, to adjust traffic flow through the network. For example, referring to FIG. 1, if a histogram for a server dimension for device/node 110 served by layer 1 node 104 indicates that device/node 110 is not meeting the QOS contract, the layer 2 node may control device/node 110 to hand off one or more end-user devices to a network device coupled to layer 1 node 106. Alternatively, the layer 2 node 102 may allocate additional resources to one or more of the network devices/nodes 108, 110, and 112 served by layer 1 node 104.

At operation 616, the layer 2 node optionally resets the processed histograms in the layer 2 histogram table and branches to operation 602 to generate the next layer 2 histogram table, as described above. This operation is optional, as indicated by the dashed-line box for operation 616 in FIG. 6. Not resetting the histograms in the histogram tables allows the process 600 to maintain a finning histogram over a longer time period than, for example, 15 minutes. It may be desirable, for example, for the layer 2 node to generate a histogram table spanning a day, a week or more. As an alternative, the layer 2 node may maintain one or more separate tables spanning these longer durations by aggregating multiple shorter duration tables over the desired duration(s).

FIGS. 9, 10, 11, and 12 are histogram diagrams that illustrate other operations that may be performed by the layer 2 node 420, shown in FIG. 4 to control the generation of histograms by the layer 1 nodes 412, 414, and 416. As shown in FIG. 9, the bins of the histograms do not need to be of equal width as long as all layer 1 nodes use the same set of variable width bins or as long as any smaller bin widths can be consolidated into a larger bin width. In the example shown in FIG. 9, bins 904, 906, 908, 910, 920, and 922 of the layer 1 histogram 902 have a bin width of 10 ms while bins 912, 914, 916, and 918 have a bin width of 5 ms. The other layer 1 histograms 930 have the same bin width distribution as does the aggregated histogram 940. Bins 912, 914, 916, and 918 may represent a target range for the desired percentile. For example, a QOS contract may require a latency less than 60 ms for 98 percent of the packets. A smaller bin size in the vicinity of 60 ms may make it easier to identify trends for controlling the network. In the example shown in FIG. 9, the desired percentile is likely to be in the range between 50 ms and 70 ms. Having smaller bin widths in this range allows for greater resolution in the desired percentile range without significantly affecting the data savings achieved by the method.

As shown in FIG. 3, ideally, each of the layer 1 histograms as well as each of the aggregated histograms corresponds to a Gaussian or Gaussian-like distribution. This correspondence is helpful as the desired percentile values are typically several standard deviations away from the mean. When the layer 1 node and/or the layer 2 node histograms to not exhibit this distribution, the ranges of the histograms may not be appropriate for the metrics being measured. In these instances, it may be desirable to adjust the bins of the histograms to achieve a Gaussian-like distribution. FIGS. 10 and 11 illustrate instances in which the ranges of the histograms are not appropriate for the latencies being measured.

In FIG. 10, the range of latencies covered by the histogram is too low for the latencies being measured. The bins in the histogram 1002 range from bin 1006, that holds a count of latencies less than 20 ms to bin 1004 that holds a count of latencies greater than 80 ms. The mismatch between the measured latencies and the range of latencies spanned by the histogram bins can be seen from the distribution of values in the bins. This mismatch between the latency values being measured and the range of the histogram may be determined by comparing the median of the histogram to the center of the histogram. In an ideal Gaussian distribution, the median would be approximately at the center of the histogram. In the example shown in FIG. 10, the median is above the center of the histogram. This mismatch may also be detected by comparing the mean of the histogram (e.g., half the number in the highest bin of the totaled histogram) to the median of the values represented by the histogram. This second value may be calculated by multiplying a latency value corresponding to the center of each bin by the number of entries in the bin, summing the result and dividing by the number of the highest bin in the totaled histogram. When these values are different, it is likely that there is a mismatch between the latency values being measured and the range of the histogram. Because there may be small differences between the median of the histogram and the central value of the histogram and/or between the mean of the values represented by the histogram and the mean of the histogram, it may be desirable to determine that a mismatch exists only when these values differ by more than a threshold value, for example one or two bin widths.

The layer 2 node may correct the mismatch between the latency values being measured and the range of the histograms by controlling the layer 1 nodes to add more bins at the high end, as shown in the histogram 1020. In this histogram, bin 1012 at the low end of the histogram holds latency values less than 40 ms. Two bins, 1014 and 1016 have been added at the high end of the histogram. The resultant histogram exhibits a Gaussian-like frequency distribution. Furthermore, the median of the histogram is closer to the center of the histogram. Although FIG. 10 shows the histogram maintaining the same number of bins, it is contemplated that the layer 2 node may control the layer 1 nodes to increase the number of bins in the histogram at the high end or at both ends to achieve a similar result. The adjustments made by the layer 2 node desirably maintain the range of the histogram so that the desired percentile can be calculated from the aggregated histogram.

In example embodiments, the layer 2 node (or layer 3 node or higher-level node) may adjust the range of values represented by the layer 1 histograms by broadcasting a message to all of the layer 1 nodes defining the adjusted histogram bins. In response to this message, the layer 1 nodes may change their initial histograms use the adjusted range during the next data collection interval.

FIG. 11 shows a similar mismatch except that the range of latencies covered by the histogram is too high for the latencies being measured. This mismatch can be detected using the same techniques described above. To realign this histogram, bins 1110 and 1112 may be consolidated with bin 1114, which corresponds to bin 1116 in the realigned histogram 1104. Also, two bins, 1118 and 1120, may be added at the low end of the histogram.

Figure 12:
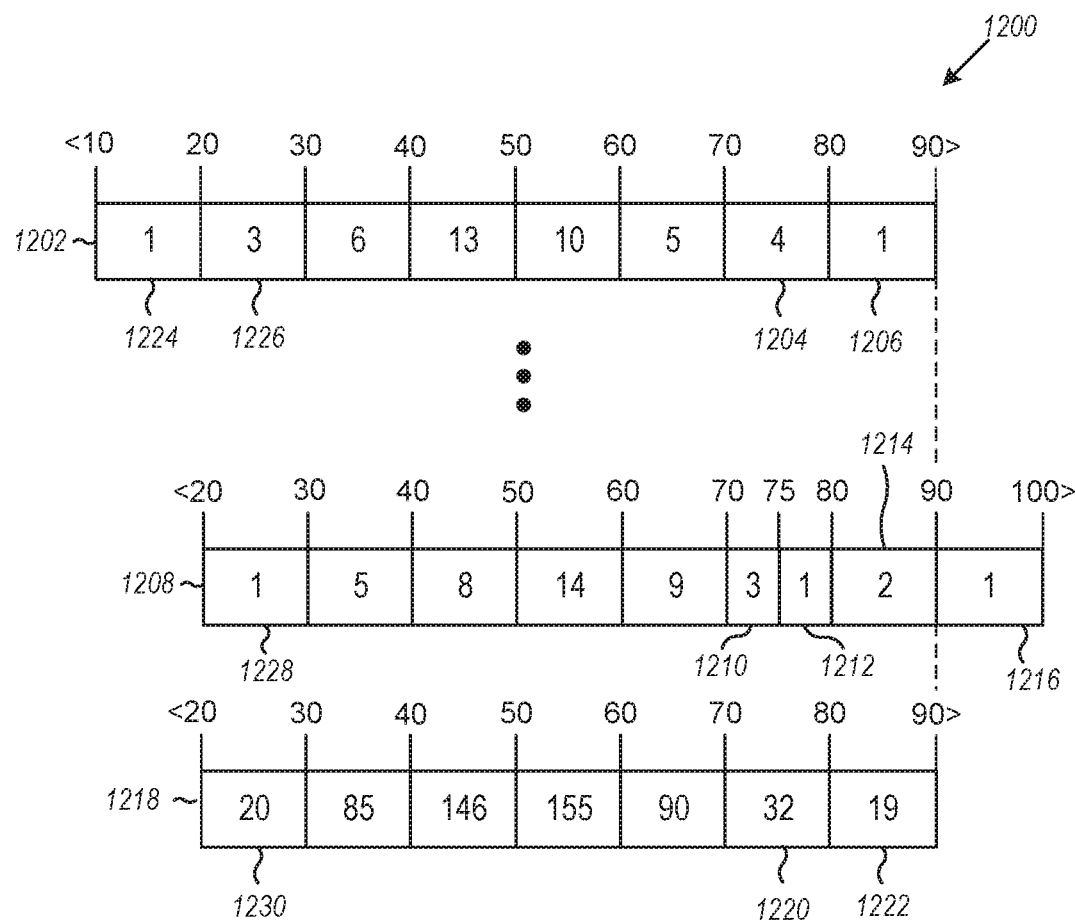

As shown in FIG. 12, it is not necessary for the histograms generated by all of the layer 1 nodes 412, 414, and 416 to have matching ranges or for the ranges of the layer 1 histograms to match the ranges of the aggregated histogram generated by the layer 2 node 420, as long as the bins can be combined. FIG. 12 shows two layer 1 histograms, 1202 and 1208. The first bin 1224 of histogram 1202 does not have a corresponding bin in histogram 1208 and the last bin, 1216, in histogram 1208 does not have a corresponding bin in the histogram 1202. Also, histogram 2108 includes two bins 1210 and 1212 that correspond to the span of a single bin 1204 in the histogram 1202. The histograms 1202 and 1208 can be combined to generate the aggregated histogram 1218 by combining the value in bin 1204 of histogram 1202 and the values in bins 1210 and 1212 in histogram 1208 when generating the count for bin 1220 of the aggregated histogram 1218. Similarly, the values in bins 1214 and 1216 of the histogram 1208 can be combined with the value in bin 1206 of histogram 1202 to generate the count for bin 1222 in the aggregated histogram 1218 and the values in bins 1224 and 1226 of the histogram 1208 can be combined with the value in bin 1228 of histogram 1208 to generate the count for bin 1230 in the aggregated histogram 1218.

Figure 13:
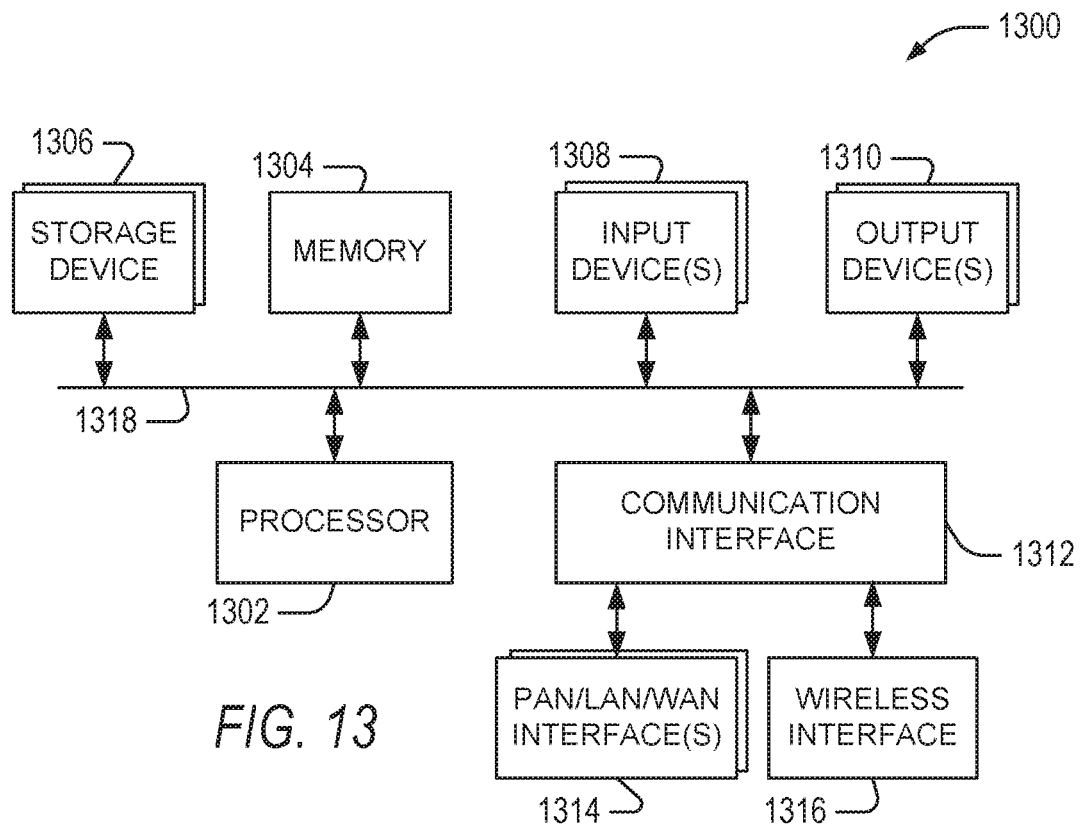
FIGS. 13 and 14 are block diagrams of example hardware that may be used in example embodiments.

FIG. 13 is a block diagram of an example processing system 1300 that may be used as one or more of the layer 1 nodes 104 and 106 shown in FIGS. 1; 225 and 245 shown in FIG. 2A; and 412, 414, and 416 shown in FIG. 4. The system 1300 may also be used as one of the layer 2 nodes 102 and 120 shown in FIG. 1 or 420 shown in FIG. 4 or as the layer 3 node 122 shown in FIG. 1. The system 1300 may also be used as the one or more of the network devices/nodes 108, 110, 112, 114, 116 or 118, or the server 128 shown in FIG. 1 or the host 215, shown in FIG. 2. Elements of the system 1300 may be used as the parser 264, input processor 266 and/or output processor 270 shown in FIG. 2B.

The system 1300 includes a processor 1302 coupled to a bus 1318. Also coupled to the bus 1318 are a memory 1304, which may include a flash memory device, random access memory (RAM) and/or read only memory (ROM); a mass storage device 1306, such as a RAID disk array or a solid-state disk; one or more input devices 1308, such as a keyboard or a pointing device; and one or more output devices 1310, such as a display screen. The memory 1304 may store computer instructions for applications that are currently running on the system 1300.

The bus 1318 also connects the system 1300 to a communication interface 1312, for example, to provide communication between the system 1300 and the network 106 shown in FIG. 1. The communications interface 1312 may be coupled to a LAN/SWAN interface 1314 such as a wired or optical Ethernet connection or wireless connection (e.g., IEEE 802.11 or IEEE 802.15). In addition, the communication interface 1312 may be coupled to an interface 1314 to one or more of a personal area network (PAN), local area network (LAN) or Wide area network (WAN). In addition, the communication interface may be coupled to a wireless interface 1316. The interfaces 1314 and 1316 may be coupled to respective transceivers and/or modems (not shown) to implement the data communications operations.

Processor 1302 may include a single-core or multi-core microprocessor, a microcontroller, or a digital signal processor (DSP) configured to execute commands stored in the memory 1304 corresponding to the programs (Internet browsers, application program interfaces (APIs), dynamically linked libraries (DLLs), or applications (APPs)) described above. The memory 1304 may also store temporary variables, a clipboard, or other information used in the execution of these programs. The programs stored in the memory 1304 may be retrieved by the processor from a separate computer readable medium, for example, a flash memory device, a CD-ROM, or digital versatile disk (DVD).

Figure 14:
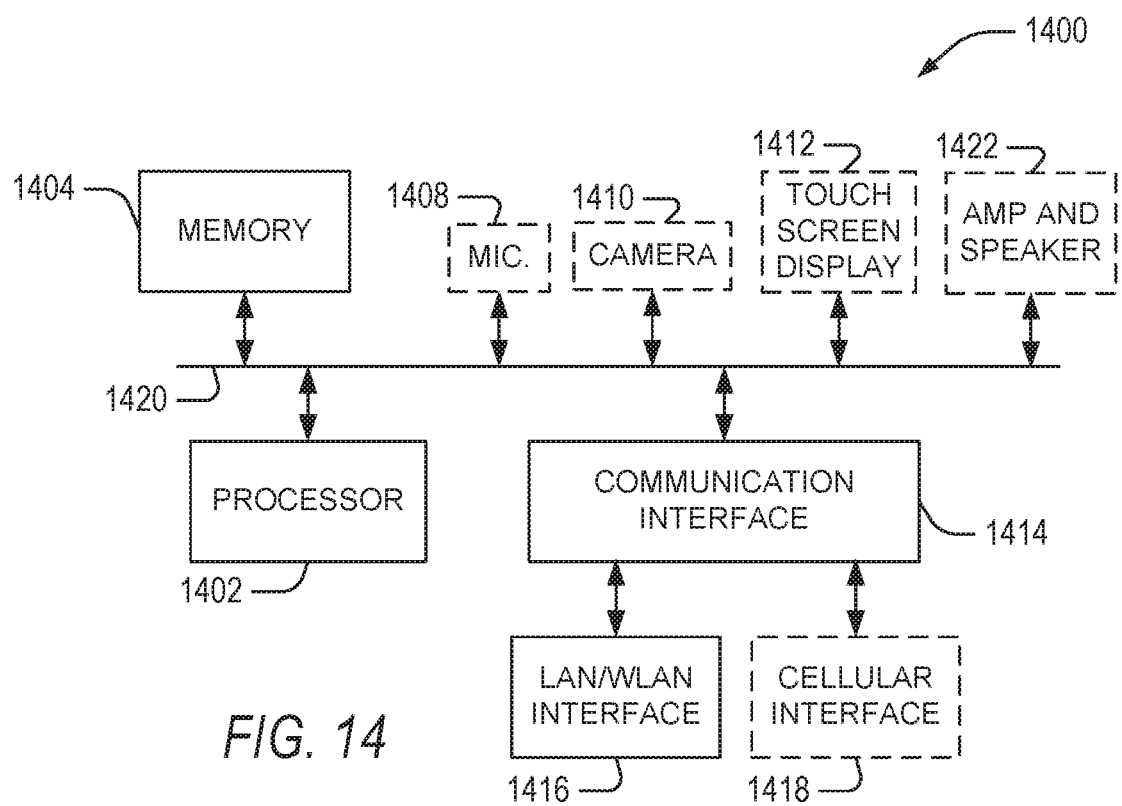

FIG. 14 is a block diagram of an example processing system 1400 that may be used as one or more of the network devices/nodes 108, 110, 112, 114, 116, or 118 shown in FIG. 1. The processing system 1400 may be, for example, a smart phone, tablet computer, personal computer, and/or a smart speaker. The system 1400 includes a processor 1402 coupled to a bus 1420. Also coupled to the bus 1420 are a memory 1404, which may include a flash memory device, random access memory (RAM) and/or read only memory (ROM); an optional microphone 1408; an optional camera 1410; an optional input and/or output device 1412, such as a touch screen display; and an optional amplifier and speaker 1422. The bus 1420 also connects the system 1400 to a communication interface 1414, for example, to provide communication between the system 1400 the device/node 108, 110, 112, 114, 116 or 118 and the access point/base station 104 or 106. It is contemplated that the amplifier and speaker 1422 may be coupled directly to an analog output port of the processor 1402 rather than to the bus 1420.

The memory 1404 may store computer instructions for applications that are currently running on the system 1400. The communications interface 1414 may be coupled to a LAN/WLAN interface 1416 such as a wired or optical Ethernet connection or wireless connection (e.g., IEEE 802.11 or IEEE 802.15). In addition, the communications interface 1414 may be coupled to a wireless interface such as a cellular interface 1418. The interfaces 1416 and 1418 may be coupled to respective transceivers and/or modems (not shown) to implement the data communications operations. One of the applications stored in the memory 1404 may send content to and/or receive content from a server or other end-user device via one or more of the access points/base stations 104 or 106, shown in FIG. 1.

Processor 1402 may include a single-core or multicore microprocessor, a microcontroller, or a digital signal processor (DSP) that is configured to execute commands stored in the memory 1404 corresponding to the programs (Internet browsers, application program interfaces (APIs), dynamically linked libraries (DLLs), or applications (APPs)) described above. The memory 1404 may also store temporary variables, a clipboard, or other information used in the execution of these programs. The programs stored in the memory 1404 may be retrieved by the processor from a separate computer readable medium, for example, a flash memory device, a CD-ROM, or digital versatile disk (DVD).

Examples

Example 1 is an apparatus in a network layer 2 node which further processes layer 1 latency data sets received from a plurality of layer 1 nodes that are configured to combine latency data from network devices coupled to the network to generate the layer 1 latency data sets for use in controlling the network, the apparatus comprising: a network interface for exchanging data with the network; processing circuitry; a memory, coupled to the processing circuitry, the memory including instructions that configure the processing circuitry to: receive, via the network interface, the plurality of layer 1 latency data sets from the plurality of layer 1 nodes; aggregate the plurality of layer 1 latency data sets to generate an aggregated data set; determine, from the aggregated latency data set, a measure of network performance; and transmit control information to at least one of the network devices, via the network interface, responsive to the measure of network performance not corresponding to a predetermined level of network performance, wherein the control information is configured to at least one of: change network loading, change routing of data transferred through the network or change priority of at least some of the data transferred through the network.

In Example 2, the subject matter of Example 1, wherein the instructions further configure the processing circuitry to aggregate the layer 1 latency data sets received from the layer 1 nodes to determine at least one of: an aggregated histogram of latency measurement histograms generated by the plurality of layer 1 nodes; a count of the latency measurements made at the plurality of layer 1 nodes; a sum of the latency measurements made at the plurality of layer 1 nodes; an arithmetic mean of the latency measurements made at the plurality of layer 1 nodes; a standard deviation and variance of the latency measurements made at the plurality of layer 1 nodes; a percentage of the latency measurements made at the layer 1 nodes that are above a predetermined value; a maximum of the latency measurements made at the layer 1 nodes; a minimum of the latency measurements made at the layer 1 nodes; or a median of the latency measurements made at the layer 1 nodes.

In Example 3, the subject matter of Example 1, wherein: the aggregated data set includes the aggregated histogram of latency measurement histograms generated by the plurality of layer 1 nodes; and the instructions that configure the processing circuitry to aggregate the plurality of layer 1 data sets configure the processing circuitry to: generate the aggregated histogram from the plurality of layer 1 histograms by aggregating corresponding bins of the plurality of layer 1 nodes into corresponding bins of the aggregated histogram; and determine from the aggregated histogram, a range of latency measurement values matching a predetermined percentile; and the instructions that configure the processing circuitry to transmit the control information configure the processing circuitry to transmit the control information responsive to the determined range of latency measurement values being greater than the predetermined latency value.

In Example 4, the subject matter of Example 3, wherein the instructions that configure the processing circuitry to determine the range of latency measurement values matching the predetermined percentile comprise instructions that configure the processing circuitry to: generate a totaled histogram having a plurality of bins corresponding to the bins in the aggregated histogram wherein each bin in the totaled histogram has a value representing a sum of the corresponding bin value in the aggregated histogram and the bin values all bins in the aggregated histogram up to the corresponding bin value; and process the totaled histogram to: determine the predetermined percentile of the greatest bin value in the totaled histogram to generate a target value; and identify a bin in the totaled histogram having the range of latency measurement values that includes the target value, wherein the range of latency measurement values of the identified bin is the range of latency measurement values matching the predetermined percentile.

In Example 5, the subject matter of Examples 3-4, wherein: the instructions that configure the processing circuitry to receive, via the network interface, the plurality of latency measurement histograms from the plurality of layer 1 nodes include instructions that configure the processing circuitry to receive an updated latency measurement histogram from one of the layer 1 nodes; and the instructions that configure the processing circuity to aggregate corresponding bins of the plurality of layer 1 histograms to generate the aggregated histogram include instructions that configure the processing circuitry to: substitute the updated latency measurement histogram from the layer 1 node for a previous latency measurement histogram from the layer 1 node; and aggregate the plurality of latency measurement histograms including the updated latency measurement histogram to generate the aggregated histogram.

In Example 6, the subject matter of Examples 3-5, wherein the latency measurement histograms received from the layer 1 nodes include a respective latency measurement histogram including counts of latency value data from each of a respective plurality of servers associated with the plurality of layer 1 nodes and the instructions further configure the processing circuitry to: transmit the control information based on the determined range of latency measurement values for the at least one of the plurality of servers being greater than the predetermined latency value.

In Example 7, the subject matter of Examples 3-6, wherein the network is configured to handle a plurality of communication types and the plurality of received histograms include a respective histogram for each of the plurality of communication types and the instructions further configure the processing circuitry to: transmit the control information based on the determined range of latency measurement values for the at least one of the plurality of communication types being greater than the predetermined latency value.

In Example 8, the subject matter of Examples 3-7, wherein: the latency measurements include measurement of respective elapsed times for respective measurements made by servers to be sent to respective ones of the layer 1 nodes; and the instructions further configure the processing circuitry to transmit the control information based on the determined range of elapsed time measurement values for the at least one of the plurality of layer 1 nodes being greater than the predetermined latency value.

In Example 9, the subject matter of Examples 3-8, wherein at the latency measurement histograms and the aggregated histogram include a plurality of corresponding bins and at least one of the plurality of corresponding bins in the latency measurement and the aggregated histogram represents a smaller range of latency measurement values than other ones of the plurality of corresponding bins in the latency measurement histograms, and the aggregated histogram.

In Example 10, the subject matter of Examples 3-9, wherein: a subset of the plurality of corresponding bins in at least one of the latency measurement histograms, represent multiple sub-ranges of a range of latency measurement values of the corresponding bins in other latency measurement histograms of the plurality of latency measurement histograms and the corresponding bin of the aggregated histogram; and the instructions that configure the processing circuitry to aggregate corresponding bins of the histograms to generate an aggregated histogram further comprise instructions that configure the processing circuitry to combine values in the multiple sub-ranges to generate a single bin having a range of latency measurement values equal to the ranges of measurement values of the corresponding bins in the other latency measurement histograms and the corresponding bin of the aggregated histogram.

In Example 11, the subject matter of Examples 3-10, wherein the instructions further configure the processing circuitry to: determine that a range of latencies represented by the bins of the aggregated histogram does not match a range of latency values experienced in the network; and transmit the control information to the plurality of layer 1 nodes to cause the plurality of layer 1 nodes to adjust at least one of the maximum latency represented by the bins or the minimum latency value represented by the bins to conform the range of latency measurements to the experienced latency values.

In Example 12, the subject matter of Example 11, wherein the instructions that cause the processing circuitry to determine the range of latencies represented by the bins of the aggregated histogram does not match the range of latency values experienced in the network includes instructions that cause the processing circuitry to: calculate a median value of the latency values represented by the aggregated histogram; and determine that the range of latencies represented by the bins of the aggregated does not match the range of latency values experienced in the network when the median value and a central value of the aggregated histogram differ by more than a threshold value.

In Example 13, the subject matter of Examples 1-12, wherein the control information transmitted via the network interface includes control information to cause at least one of the network devices to adjust priorities of packets processed by the at least one network device to increase the priority of packets that are subject to a predetermined quality of service (QOS) corresponding to the predetermined latency value relative to packets that are not subject to the predetermined QOS.

In Example 1, the subject matter of Examples 1-13, wherein the control information transmitted via the network interface includes control information to cause the at least one of the network devices to reroute packets processed by the at least one network device, the rerouted packets being subject to a predetermined quality of service (QOS) corresponding to the predetermined latency value.

Example 15 is a method for a layer 2 node to control a network based on a plurality of layer 1 latency data sets received from a plurality of layer 1 nodes that are configured to combine latency data from network devices coupled to a network to generate the layer 1 latency data sets, the method comprising: receiving, from the plurality of layer 1 nodes, a plurality of layer 1 histograms as the plurality of layer 1 data sets, each layer 1 histogram including a corresponding plurality of bins, each bin including a respective bin value representing a count of latency measurements within a respective range of latency measurement values; aggregating the corresponding bins of the plurality of layer 1 histograms to generate an aggregated histogram having a plurality of bins corresponding to the bins of the layer 1 histograms; determining, from the aggregated histogram, a range of latency measurement values matching the predetermined percentile; and transmitting control information to at least one of the network devices responsive to the determined range of latency measurement values being greater than a predetermined latency value, wherein the control information is configured to cause the at least one of the plurality of the network devices to at least one of: change network loading, change routing of data transferred through the network or change priority of at least some of the data transferred through the network.

In Example 16, the subject matter of Example 15, wherein determining the range of latency measurement values matching the predetermined percentile comprises: generating a totaled histogram having a plurality of bins corresponding to the bins in the aggregated histogram, wherein each bin in the totaled histogram has a value representing a sum of the corresponding bin value in the aggregated histogram and the bin values all bins in the aggregated histogram up to the corresponding bin value; and processing the totaled histogram including: determining the predetermined percentile of the greatest bin value in the totaled histogram to generate a target value; and identifying a bin in the totaled histogram having a range of latency values that includes the target value, wherein the range of latency measurement values of the identified bin is the range of latency measurement values matching the predetermined percentile.

In Example 17, the subject matter of Examples 15-16, wherein: receiving the plurality of layer 1 histograms from the plurality of layer 1 nodes include receiving an updated layer 1 histogram from one of the layer 1 nodes; and aggregating the corresponding bins of the plurality of layer 1 histograms to generate the aggregated histogram includes: substituting the updated layer 1 histogram for a previous layer 1 histogram from the layer 1 node; and reaggregating the plurality of layer 1 histograms including the updated layer 1 histogram to generate the aggregated histogram.

Example 18 is an apparatus for controlling a network based on a plurality of layer 1 data sets received from a plurality of layer 1 nodes that are configured to combine latency data from network devices coupled to a network to generate the layer 1 latency data sets, the apparatus comprising: means for receiving, as the plurality of layer 1 data sets, a plurality of layer 1 histograms, each layer 1 histogram including a corresponding plurality of bins, each bin including a respective bin value representing a count of latency measurements within a respective range of latency measurement values; means for aggregating the corresponding bins of the plurality of layer 1 histograms to generate an aggregated histogram having a plurality of bins corresponding to the bins of the layer 1 histograms; means for determining, from the aggregated histogram, a range of latency measurement values matching the predetermined percentile; and means for transmitting control information to at least one of the network devices responsive to the determined range of latency measurement values being greater than a predetermined latency value, wherein the control information is configured to cause the at least one of the network devices to at least one of: change network loading, change routing of data transferred through the network or change priority of at least some of the data transferred through the network.

In Example 19, the subject matter of Example 18, wherein the means for determining the range of latency measurement values matching the predetermined percentile comprises: means for generating a totaled histogram having a plurality of bins corresponding to the bins in the aggregated histogram, wherein each bin in the totaled histogram has a value representing a sum of the corresponding bin value in the aggregated histogram and the bin values all bins in the aggregated histogram up to the corresponding bin value; and means for processing the totaled histogram including: means for determining the predetermined percentile of the greatest bin value in the totaled histogram to generate a target value; and means for identifying a bin in the totaled histogram having a range of latency values that includes the target value, wherein the range of latency measurement values of the identified bin is the range of latency measurement values matching the predetermined percentile.

In Example 20, the subject matter of Examples 18-19, wherein: the means for receiving the plurality of layer 1 histograms from the plurality of layer 1 nodes includes means for receiving an updated layer 1 histogram from one of the layer 1 nodes; and the means for aggregating the corresponding bins of the plurality of layer 1 histograms to generate the aggregated histogram includes: means for substituting the updated layer 1 histogram for a previous layer 1 histogram from the one layer 1 node; and means for aggregating the plurality of layer 1 histograms including the updated layer 1 histogram to generate the aggregated histogram.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20

Example 24 is a method to implement of any of Examples 1-20.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An apparatus in a network layer 2 node which processes a plurality of layer 1 latency data sets received from a plurality of layer 1 nodes, the plurality of layer 1 latency data sets including values representing latency data from network devices coupled to a network, the apparatus comprising:
   a network interface for exchanging data with the network;
   processing circuitry;
   a memory, coupled to the processing circuitry, the memory including instructions that configure the processing circuitry to:
      receive, via the network interface, the plurality of layer 1 latency data sets from the plurality of layer 1 nodes, respectively, at least one value of each layer 1 latency data set representing a combination of multiple latency measurements from a respective one of the network devices;
      aggregate the plurality of layer 1 latency data sets to generate an aggregated latency data set;
      determine, from the aggregated latency data set, a measure of network performance; and
      transmit control information to at least one network device of the network devices, via the network interface, responsive to the measure of network performance not corresponding to a predetermined level of network performance, wherein the control information is configured to at least one of: change network loading, change routing of data transferred through the network or change priority of at least some of the data transferred through the network.

2. The apparatus of claim 1, wherein the instructions further configure the processing circuitry to aggregate the plurality of layer 1 latency data sets received from the plurality of layer 1 nodes to determine at least one of:
   an aggregated histogram of a plurality of layer 1 latency measurement histograms generated by the plurality of layer 1 nodes;
   a count of the latency measurements made at the plurality of layer 1 nodes;
   a sum of the latency measurements made at the plurality of layer 1 nodes;
   an arithmetic mean of the latency measurements made at the plurality of layer 1 nodes;
   a standard deviation and variance of the latency measurements made at the plurality of layer 1 nodes;
   a percentage of the latency measurements made at the plurality of layer 1 nodes that are above a predetermined value;
   a maximum of the latency measurements made at the plurality of layer 1 nodes;
   a minimum of the latency measurements made at the plurality of layer 1 nodes;
   or a median of the latency measurements made at the plurality of layer 1 nodes.

3. The apparatus of claim 2, wherein:
   the aggregated latency data set includes the aggregated histogram and the aggregated histogram includes an aggregation of a plurality of layer 1 latency measurement histograms generated by the plurality of layer 1 nodes; and
   the instructions that configure the processing circuitry to aggregate the plurality of layer 1 latency data sets configure the processing circuitry to:

generate the aggregated histogram from the plurality of layer 1 latency measurement histograms by aggregating corresponding bins of the plurality of layer 1 latency measurement histograms into corresponding bins of the aggregated histogram; and determine, from the aggregated histogram, a range of latency measurement values matching a predetermined percentile; and the instructions that configure the processing circuitry to transmit the control information configure the processing circuitry to transmit the control information responsive to the determined range of latency measurement values being greater than a predetermined latency value.

4. The apparatus of claim 3, wherein the instructions that configure the processing circuitry to determine the range of the latency measurement values matching the predetermined percentile comprise instructions that configure the processing circuitry to:

generate a totaled histogram having a plurality of bins corresponding to the bins of the aggregated histogram, wherein each bin in the totaled histogram has a bin value representing a sum of a bin value in a corresponding bin of the aggregated histogram and respective bin values of all bins in the aggregated histogram having bin numbers less than a bin number of the corresponding bin; and process the totaled histogram to:
  determine the predetermined percentile of a greatest bin value in the totaled histogram to generate a target value; and
  identify a bin in the totaled histogram having the range of latency measurement values that includes the target value, wherein the range of latency measurement values of the identified bin is the range of latency measurement values matching the predetermined percentile.

5. The apparatus of claim 3 wherein:
the instructions that configure the processing circuitry to receive, via the network interface, the plurality of layer 1 latency measurement histograms from the plurality of layer 1 nodes include instructions that configure the processing circuitry to receive an updated layer 1 latency measurement histogram from one layer 1 node of the plurality of the layer 1 nodes; and the instructions that configure the processing circuitry to aggregate the corresponding bins of the plurality of layer 1 latency measurement histograms to generate the aggregated histogram include instructions that configure the processing circuitry to:
  substitute the updated layer 1 latency measurement histogram from the one layer 1 node for a previous layer 1 latency measurement histogram for the one layer 1 node; and
  aggregate the plurality of layer 1 latency measurement histograms including the updated layer 1 latency measurement histogram to generate the aggregated histogram.

6. The apparatus of claim 3, wherein the plurality of layer 1 latency measurement histograms received from the plurality of layer 1 nodes include a respective layer 1 latency measurement histogram including counts of latency value data from each of a respective plurality of servers associated with the plurality of layer 1 nodes and the instructions further configure the processing circuitry to:

transmit the control information based on the determined range of latency measurement values for at least one of the plurality of servers being greater than the predetermined latency value.

7. The apparatus of claim 3, wherein the network is configured to handle a plurality of communication types and the plurality of layer 1 latency measurement histograms include a respective layer 1 latency measurement histogram for each of the plurality of communication types and the instructions further configure the processing circuitry to:
transmit the control information based on the determined range of latency measurement values for at least one communication type of the plurality of communication types being greater than the predetermined latency value.

8. The apparatus of claim 3, wherein:
the latency measurements include respective elapsed time measurement values indicating respective elapsed times for respective latency measurements made by servers to be received by respective ones of the plurality of layer 1 nodes; and
the instructions further configure the processing circuitry to transmit the control information based on a determined range of elapsed time measurement values for at least one layer 1 node of the plurality of layer 1 nodes being greater than the predetermined latency value.

9. The apparatus of claim 3, wherein at the plurality of layer 1 latency measurement histograms and the aggregated histogram include a plurality of corresponding bins and at least one bin of the plurality of corresponding bins in the plurality of layer 1 latency measurement histograms and the aggregated histogram represents a smaller range of latency measurement values than other bins of the plurality of corresponding bins in the plurality of layer 1 latency measurement histograms, and the aggregated histogram.

10. The apparatus of claim 3, wherein:
one bin of a plurality of bins in at least one layer 1 latency measurement histogram of the plurality of layer 1 latency measurement histograms represents multiple sub-ranges of a range of latency measurement values of corresponding bins in other layer 1 latency measurement histograms of the plurality of layer 1 latency measurement histograms and in a corresponding bin of the aggregated histogram; and
the instructions that configure the processing circuitry to aggregate corresponding bins of the layer 1 latency measurement histograms to generate an aggregated histogram configure the processing circuitry to combine values in the multiple sub-ranges to generate a single bin having a range of latency measurement values equal to the range of latency measurement values of the corresponding bins in the other latency measurement histograms and in the corresponding bin of the aggregated histogram.

11. The apparatus of claim 3, wherein the instructions further configure the processing circuitry to:
determine that a range of latency values represented by at least one of the bins of the aggregated histogram does not match a range of latency values experienced in the network; and
transmit the control information to the plurality of layer 1 nodes to cause the plurality of layer 1 nodes to adjust at least one of a maximum latency represented by the at least one bin of the layer 1 latency measurement histograms or a minimum latency value represented by the at least one bin of the layer 1 latency measurement histograms to conform the range of latency values represented by the at least one bin of the layer 1 latency measurement histograms to the range of latency values experienced in the network.

12. The apparatus of claim 11, wherein the instructions that cause the processing circuitry to determine the range of latency values represented by the at least one bin of the aggregated histogram does not match the range of latency values experienced in the network includes instructions that cause the processing circuitry to:
calculate a median value of the latency values represented by the aggregated histogram; and
determine that the range of latency values represented by the at least one bin of the aggregated does not match the range of latency values experienced in the network when the median value and a central value of the aggregated histogram differ by more than a threshold value.

13. The apparatus of claim 1, wherein the control information transmitted via the network interface includes control information to cause at the least one network device to adjust priorities of packets processed by the at least one network device to increase the priorities of the packets that are subject to a predetermined quality of service (QOS) corresponding to a predetermined latency value relative to the priorities of the packets that are not subject to the predetermined QOS.

14. The apparatus of claim 1, wherein the control information transmitted via the network interface includes control information to cause the at least one network device to reroute packets processed by the at least one network device, the rerouted packets being subject to a predetermined quality of service (QOS) corresponding to a predetermined latency value.

15. A method for a layer 2 node to control a network based on a plurality of layer 1 latency data sets received from a plurality of layer 1 nodes, the plurality of layer 1 latency data sets including latency values representing latency data from respective network devices coupled to a network, the method comprising:
receiving, from the plurality of layer 1 nodes, a plurality of layer 1 latency data histograms as the plurality of layer 1 latency data sets, each layer 1 latency data histogram corresponding to a respective network device of the network devices and including, as the latency values, a corresponding plurality of bin values, at least one bin value representing a count of multiple latency measurement values within a respective range of latency measurement values for the respective network device;
aggregating the corresponding plurality of bins of the plurality of layer 1 latency data histograms to generate an aggregated histogram having a plurality of bins corresponding to the plurality of bins of the plurality of layer 1 latency data histograms;
determining, from the aggregated histogram, a range of the latency measurement values matching a predetermined percentile; and
transmitting control information to at least one network device of the network devices responsive to the determined range of the latency measurement values being greater than a predetermined latency value, wherein the control information is configured to cause the at least one network device to at least one of: change network loading, change routing of data transferred through the network or change priority of at least some of the data transferred through the network.

16. The method of claim 15, wherein determining the range of the latency measurement values matching the predetermined percentile comprises:
generating a totaled histogram having a plurality of bins corresponding to the bins of the aggregated histogram, wherein each bin in the totaled histogram has a bin value representing a sum of a bin value in a corresponding bin of the aggregated histogram and respective bin values of all bins in the aggregated histogram having bin numbers less than a bin number of the corresponding bin of the aggregated histogram; and
processing the totaled histogram including:
determining the predetermined percentile of a greatest bin value in the totaled histogram to generate a target value; and
identifying a bin in the totaled histogram having a range of latency measurement values that includes the target value, wherein the range of latency measurement values of the identified bin is the range of latency measurement values matching the predetermined percentile.

17. The method of claim 15 wherein:
receiving the plurality of layer 1 latency data histograms from the plurality of layer 1 nodes includes receiving an updated layer 1 latency data histogram from one further node of the plurality of layer 1 nodes; and
aggregating the corresponding bins of the plurality of layer 1 histograms to generate the aggregated histogram includes:
substituting the updated layer 1 latency data histogram for a previous layer 1 latency measurement histogram from the one further layer 1 node; and
reaggregating the plurality of layer 1 latency data histograms including the updated layer 1 latency data histogram to generate the aggregated histogram.

18. An apparatus for controlling a network based on a plurality of layer 1 latency histograms received from a plurality of layer 1 nodes, the plurality of layer 1 latency histograms including bin values representing latency data from network devices coupled to a network, the apparatus comprising:
means for receiving the plurality of layer 1 latency histograms from the plurality of layer 1 nodes, respectively, at least one bin value of each layer 1 latency histogram representing a count of multiple latency measurements within a respective range of latency measurement values for a respective one of the network devices;
means for aggregating the plurality of layer 1 latency histograms to generate an aggregated histogram having a plurality of bin values, each bin value of the aggregated histogram corresponding to a sum of respective ones of the bin values of the plurality of layer 1 latency histograms, respectively;
means for determining, from the aggregated histogram, a range of the latency measurement values matching a predetermined percentile; and
means for transmitting control information to at least one network device of the network devices responsive to the determined range of the latency measurement values being greater than a predetermined latency value, wherein the control information is configured to cause the at least one network device to at least one of: change network loading, change routing of data transferred through the network or change priority of at least some of the data transferred through the network.

19. The apparatus of claim 18, wherein the means for determining the range of the latency measurement values matching the predetermined percentile comprises:
   means for generating a totaled histogram having a plurality of bin values corresponding to the respective bin values of the aggregated histogram, wherein each bin value in the totaled histogram represents a sum of a corresponding bin value of the aggregated histogram and the all bin values of the aggregated histogram having bin numbers less than a bin number of the corresponding bin value; and
   means for processing the totaled histogram including:
      means for determining the predetermined percentile of a greatest bin value in the totaled histogram to generate a target value; and
      means for identifying a bin number in the totaled histogram representing a range of latency values that includes the target value, wherein the range of latency measurement values of the identified bin number is the range of latency measurement values matching the predetermined percentile.

20. The apparatus of claim 18 wherein:
   the means for receiving the plurality of layer 1 latency histograms from the plurality of layer 1 nodes includes means for receiving an updated layer 1 latency histogram from one of the layer 1 nodes; and
   the means for aggregating the plurality of layer 1 histograms to generate the aggregated histogram includes:
      means for substituting the updated layer 1 latency histogram for a previous layer 1 latency histogram from the one layer 1 node; and
      means for summing the respective bin values of the plurality of layer 1 histograms including the bin values of the updated layer 1 latency histogram to generate the aggregated histogram.

* * * * *